(12) United States Patent
Huang

(10) Patent No.: US 6,370,129 B1
(45) Date of Patent: Apr. 9, 2002

(54) HIGH-SPEED DATA SERVICES USING MULTIPLE TRANSMIT ANTENNAS

(75) Inventor: Howard Huang, New York, NY (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/587,345

(22) Filed: Jun. 5, 2000

Related U.S. Application Data

(60) Provisional application No. 60/141,293, filed on Jun. 28, 1999.

(51) Int. Cl.$^7$ ................................. H04Q 7/00

(52) U.S. Cl. ....................... 370/329; 370/542

(58) Field of Search ................ 370/203, 335, 370/342, 479, 536, 542, 543, 544, 329; 375/130, 260, 137, 142, 143

(56) References Cited

U.S. PATENT DOCUMENTS

| | | | |
|---|---|---|---|
| 4,128,740 A | | 12/1978 | Graziano |
| 5,347,535 A | | 9/1994 | Karasawa et al. |
| 5,463,657 A | | 10/1995 | Rice |
| 5,515,378 A | | 5/1996 | Roy et al. |
| 5,592,490 A | | 1/1997 | Barratt et al. |
| 5,652,764 A | * | 7/1997 | Kanzaki ..................... 375/200 |
| 5,719,899 A | | 2/1998 | Thielecke et al. |
| 5,982,327 A | | 11/1999 | Vook et al. |
| 6,052,599 A | | 4/2000 | Driessen |
| 6,058,105 A | | 5/2000 | Hochwald et al. |
| 6,064,388 A | * | 5/2000 | Kobayakawa et al. ...... 342/378 |
| 6,091,759 A | * | 7/2000 | Rotstein et al. ............. 375/140 |
| 6,108,565 A | * | 8/2000 | Scherzer ..................... 455/562 |
| 6,128,330 A | * | 10/2000 | Schilling ..................... 375/341 |
| 6,163,566 A | * | 12/2000 | Shiino ........................ 375/143 |

OTHER PUBLICATIONS

Chih–Lih, I, et al, "IS–95 Enhancements for Multimedia Services," Bell Labs Tech. J., Autumn, 1996, pp. 60–87.
Wolniansky, P.W., et al, "V–Blast: An Architecture for Realizing Very High Data Rates Over the Rich–Scattering Wireless Channel," Proc. ISSSE, Sep. 1998.
Golden, G.D., et al, "Detection algorithm and initial laboratory results using V–BLAST space–time communication architecture", Elect. Ltrs., vol. 35, No. 1, Jan. 7, 1999 pp 14–15.

\* cited by examiner

Primary Examiner—Douglas Olms
Assistant Examiner—Ken Vanderpuye
(74) Attorney, Agent, or Firm—William Ryan

(57) ABSTRACT

High-speed wireless data systems and methods are described for simultaneously supporting multiple data users, including flexible mixed-traffic services, using an illustrative CDMA architecture. Embodiments are compatible with current and third generation CDMA systems, while achieving spectral efficiencies that are in some cases an order of magnitude or more higher. Embodiments advantageously employ multiple antennas at the transmitter and receiver and code spreading to realize multiple access systems. Some illustrative receiver embodiments advantageously employ a decorrelating detector, while others feature a decorrelating decision-feedback detector.

In typical operation, each of a plurality of high-speed data streams directed to respective data users is demultiplexed into multiple (G>1) lower rate substreams, which are modulated by a CDMA spreading code and transmitted from M antennas at a base station. A receiver employs P antennas and multi-user detection to demodulate the G data substreams of its associated user. Performance measures for a variety of illustrative transmission and receiver configurations are derived using novel techniques for calculating system level capacities and spectral efficiencies (measured in bits per second per Hertz per sector). System design and configuration tradeoffs are readily made based on such performance determinations.

21 Claims, 11 Drawing Sheets

LEGEND

A  Eb/No=14.6dB
B  Eb/No=9.6dB
C  Eb/No=7.1dB
D  Eb/No=4.6dB

LEGEND

A  ZONE 1, MIXED TRAFFIC
B  ZONE 2, MIXED TRAFFIC
C  WHOLE SECTOR, DATA SYSTEM
D  WHOLE SECTOR, MIXED
E  ZONE 3, MIXED TRAFFIC
*  OPERATING POINT FOR VOICE SYSTEM

HIGH-SPEED DATA SERVICES USING MULTIPLE TRANSMIT ANTENNAS

RELATED APPLICATIONS

The present application is based on provisional application Ser. No. 60/141,293 filed Jun. 28, 1999, which provisional application is hereby incorporated by reference.

This application is also related to concurrently filed non-provisional application by G. J. Foschini, et al. entitled High-Speed Data Services Using Multiple Transmit Antennas, which non-provisional application is assigned to the assignee of the present invention.

FIELD OF THE INVENTION

The present invention relates to high-speed wireless communication systems and methods. More particularly, the present invention relates to such communications systems and methods offering mobile multiple access for voice and data communications users. Still more particularly, the present invention relates to such wireless communications systems and methods employing multiple transmit and receive antenna structures.

BACKGROUND OF THE INVENTION

Mobile wireless voice communications systems and services are presently in widespread use. Provision of high-speed wireless packet data services for web browsing, multimedia delivery and other applications is an important goal for evolving wireless systems and services, especially those based on code division multiple access (CDMA) systems.

While proposals have been made for providing high-speed data using schemes such as multicode and variable spreading gain, these do not address limitations based on insufficient cell capacity; these techniques merely involve trading voice capacity for data capacity. High-speed data systems for simultaneously supporting multiple data users requires a significant increase in spectral efficiency-measured in bits/chip per sector or equivalently, bits per second per Hertz per sector. See generally, K. S. Gilhousen. I. M. Jacobs, R Padovani, A. J. Viterbi, L. A Weaver Jr., C. E. Wheatley III. "On the Capacity of a Cellular CDMA System," *IEEE Trans. on Vehicular Technology*, 40, No.2: 303–312, May 1991.

In G. J. Foschini, "Layered Space-Time Architecture for Wireless Communication in a Fading Environment When using Multi-Element Antennas," *Bell Labs Tech. J.*, Autumn 1996, pp. 41–59, a communication technique is described for achieving very high data rates in a wireless system using multiple transmit antennas, multiple receive antennas, and advanced signal processing at the receiver. High data rates in such systems can be attributed to many factors, including the effects of a rich scattering environment that causes a signal from a single transmitter to appear highly uncorrelated at each of the receive antennas, and the benefits of advanced signal processing at the receiver for separating the signals from multiple transmit antennas in a near-optimum fashion using multiple receive antennas. The context of the last-cited Foschini paper is that of narrowband channels and point-to-point communications, rather than systems for high-speed data services in a cellular CDMA system.

SUMMARY OF THE INVENTION

Limitations of the prior art are overcome and a technical advance is made in accordance with the present invention, illustrative embodiments of which are described below. In one aspect, the present invention provides high-speed data systems and methods for simultaneously supporting multiple data users. Moreover, present inventive embodiments provide flexible mixed-traffic services that simultaneously provide different data rates for each of a plurality of users, including high rate data and voice users.

In illustrative embodiments described below, a physical layer, CDMA architecture is disclosed for providing such high-speed systems and related services. Embodiments of the present invention are compatible with current and third generation CDMA systems (such as the US CDMA2000 and European/Japanese Wideband CDMA systems), and achieve spectral efficiencies that are in some cases an order of magnitude or more higher than those of current systems.

As in point-to-point narrowband systems described, e.g., in the above-cited Foschini paper, embodiments of the present invention advantageously employ multiple antennas at the transmitter and receiver. However, unlike such prior systems, presently disclosed embodiments include the use of code spreading to realize multiple access systems simultaneously supporting multiple users. Inventive architectures and configurations are described to meet the demand for high-speed data services to mobile users.

In accordance with another aspect of the present invention, some illustrative receiver embodiments advantageously employ a decorrelating detector, while other illustrative embodiments feature a decorrelating decision-feedback detector.

In providing backward compatibility for traditional services, voice users are typically assumed to use conventional single antenna receivers, and their signals are transmitted from the base station using a single antenna. In contrast, mobile data users can employ multiple antennas and advanced signal processing, and signals are received from multiple base station antennas. Present inventive principles are illustratively applied to transmission and detection of high data rate signals; transmission and detection of low-rate (e.g., voice) signals is unchanged and can operate simultaneously with systems and methods employing teachings of the present invention.

In typical operation, each of a plurality of high-speed data streams directed to respective data users is demultiplexed into multiple lower rate substreams. In general, the rates of both the high-speed data streams and the lower rate substreams can be different. However, for illustrating the principles of this invention, it proves convenient to assume that the high data rate streams are the same for all users and that these streams are each demultiplexed into G>1 lower rate substreams. Each of these substreams illustratively has the same rate as a conventional voice data stream. These substreams are modulated by a CDMA spreading code and transmitted from M antennas at a base station. The receiver employs P antennas and multi-user detection to demodulate the G data substreams associated with a user.

Performance measures for each of a variety of different transmission and receiver techniques are illustratively derived in terms of spectral efficiency measured in bits per chip per sector. In particular, it proves advantageous to determine the number of users that can be supported in a sector at a given data rate, error rate and outage rate. It proves useful to perform analyses of spectral efficiencies of CDMA systems using simulations of multiple antennas and multi-user detectors in combination with simulations of link level bit error rate performance and system level signal-to-interference ratios.

Novel techniques are provided for calculating system level capacities and spectral efficiencies (measured in bits per second per Hertz per sector) by incorporating link level results with system level outage simulations. System spectral efficiency is then determined as a function of various parameters (e.g., number of transmit antennas. transmit diversity order, random or orthogonal code transmission, same or different code transmission, number of receive antennas, and type of receiver). Thus, system design and configuration tradeoffs are readily made based on such performance determinations. A number of selection considerations and design examples are presented below.

Using presently disclosed inventive techniques, illustrative systems support 64 users per 120-degree sector, each at 76.8 Kbps in a 1.25 MHz band, with a spectral efficiency equal to 4 bps/Hz per sector—an order if magnitude greater than that of a conventional (single-antenna) voice CDMA system. Other illustrative embodiments permit design of systems supporting even higher data rate users and a variety of mixed rate traffic. Thus, for example, other illustrative embodiments of the present invention g support seven high-speed data users per sector, each operating at 384 Kbps, simultaneously with 8 voice users, each at 9.6 Kbps. Such results are illustratively realized in systems employing four transmit antennas at the base station and laptop-sized mobile receiver devices, each using twelve receive antennas and an illustrative multi-user detection algorithm.

BRIEF DESCRIPTION OF THE DRAWINGS

The above-summarized invention will be more fully understood upon consideration of the following detailed description and the attached drawing wherein:

FIG. 2 shows transmission assignments for a representative user at a receiver in the system of FIG. 1, where different codes are used and the transmit diversity order, $M_t$, is 1.

FIG. 3 shows transmission assignments for a representative user at a receiver in the system of FIG. 1, where the same code is used and the transmit diversity order, $M_t$, is 1.

FIG. 4 shows transmission assignments for a representative user at a receiver in the system of FIG. 1, where different codes are used and $M_t=2$.

FIG. 5 shows transmission assignments for a representative user at a receiver in the system of FIG. 1, where the same code is used and $M_t=2$.

DETAILED DESCRIPTION

System Architecture and Resources

Figure 1:
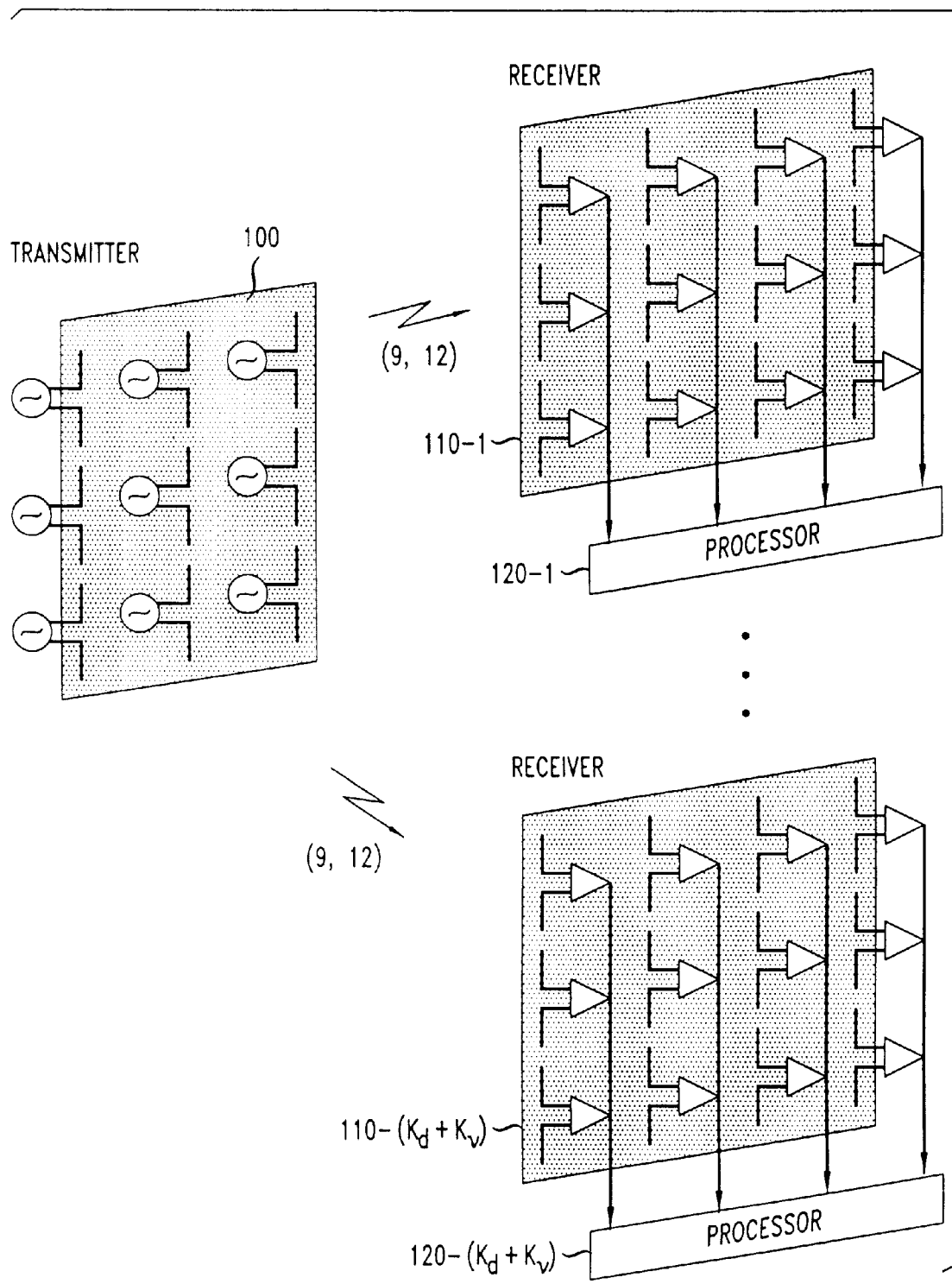
FIG. 1 shows an overall system representation of a transmitting station and a plurality of receiving stations.

FIG. 1 shows an overall view of an illustrative system having a transmitting station 100 and a plurality of receiving stations 110-i, i=1, 2, . . . , ($K_d+K_v$), where $K_d$ is the number of users demodulating high data rate streams, and $K_v$ is the number of users demodulating voice streams. Antennas at transmitter 100 and receiving stations 110-i are each seen to be multi-element arrays (MEAs). Illustrative transmitter 100 is seen to have 9 transmitter antennas, and each of the illustrative receivers 110-i is shown as having 12 receive antennas. Thus, in the terminology of the above-cited Foschini, et al paper, the number of transmit and receive antennas may be represented by the pair ($n_T$, $n_R$) or, for the example of FIG. 1, by (9,12).

At each receiver 110-i, signals received on each of the receive antennas are applied to a processor 120-1 for separating, detection (using one of a variety of detection techniques) and delivering respective ones of the received signals to the appropriate user. It is assumed for purposes of illustration that well-known CDMA coding and transmission techniques (as modified in the manner to be described below) are applied to spread signals arriving at transmitter 100 for transmission over the several antennas at the transmitter.

One aspect of illustrative embodiments of the present invention relates to tradeoffs among the various CDMA system resources, including multiple antennas, codes, and multi-user detector technologies, as they relate to system performance. It proves useful, therefore, to initially review certain of these resources and selected respective considerations in their use.

Multiple Transmit Antennas and Spreading Codes

A first resource to be considered in such tradeoffs is the use of multiple transmit antennas. In general, multiple transmit antennas offer two benefits: transmit diversity and spatial separation. If there is uncorrelated fading between or among signals from transmit antennas at the receiver, transmitting the same data from multiple antennas provides transmit diversity gain. On the other hand, independent data streams can be transmitted from different antennas, and if the receiver has multiple antennas, it can demodulate the data streams based only on their spatial separation.

Potential gains from both benefits are linked with the number of spreading codes used. In orthogonal spreading code systems, this number is limited and the codes become a valuable commodity. In particular, if the same code is used to spread different data on different antennas, then spectral efficiency greater than one can be achieved. Since multiple receive antennas are required to demodulate signals based on their spatial separation, multiple antennas are required at both the transmitter and receiver to achieve a spectral efficiency greater than one for orthogonal code systems.

In some present illustrative embodiments, transmit diversity may be achieved by using different codes to spread the same data on different antennas. Hence increasing the diversity order often requires using more codes. Because of spatial separation, we can use the same code to spread data for different antennas. However, we could also use different codes to spread the data, thereby achieving even more separation (in the code dimension and space dimension) at the receiver. Hence by using more codes, we can reduce multi-access interference and improve performance at the receiver.

Multiple Receive Antennas

Another illustrative system parameter typically considered in tradeoff determinations relates to the number of receive antennas. Multiple antennas at the receiver provide three key benefits, as will be further understood from consideration of the above-cited paper by Foschini. First, as mentioned above, they can be used to distinguish signals based solely on their spatial characteristics. Second, they provide receiver diversity against fading. Third, they provide antenna gain through coherent combining.

It should be noted that the number of receive antennas ties in with aspects of transmitter design. First, since the ability to spatially separate signals is related to the number of receive antennas, it affects the decision for using the same code or different codes to transmit from different antennas. Second, because the overall diversity order is the product of the transmit, receive, and multipath diversity orders and because of the diminishing marginal gains of increased diversity order, the number of receive antennas also impacts the amount of transmit diversity to be used.

Multi-User Detection

In illustrative inventive systems, a receiver such as 110-i in FIG. 1 must demodulate G data substreams for its desired user output of a total $K_d G + K_v$ (in-cell) CDMA channels, where $K_d$ is the number of data users (each with G substreams) and $K_v$ is the number of voice users. Even if orthogonal codes are used at the base transmitter, a frequency selective channel will cause multipath components to interfere with each other.

It proves advantageous to use a multi-user detector to account for multi-access interference, and to take advantage of multiple receive antennas using space-time multi-user detection. In particular, it proves advantageous to employ two space-time multi-user detection algorithms: a decorrelating detector and a decorrelating decision feedback detector—though other particular detectors will be used in some applications. Both algorithms operate on a sufficient statistic vector using a space-time matched (2-D rake) filter. The decorrelator projects each component of the vector into the null space of the other components. The decorrelating decision feedback detector additionally uses an iterative algorithm that estimates, reconstructs, and subtracts the substreams of the desired user. The decorrelating decision feedback detector can be considered to be a generalization of the conventional V-BLAST algorithm for CDMA signals described, for example, in P. W. Woliansky. G. J. Foschini. G. D. Golden, R. A. Valenzuela, "V-BLAST: An architecture for realizing very high data rates over the rich-scattering wireless channel." *Proc./SSSE,* September 1998. (The narrowband BLAST system is a special case of the CDMA system where $K_d=1$, $K_v=0$, and G=M. In this case, the 2-D rake filter corresponds to the spatial matched filter operation, and the decorrelating decision feedback detector corresponds to the nulling, ordering, and canceling operations of the V-BLAST detector). While both the decorrelating detector and the decorrelating decision feedback detector algorithms are potentially computationally intensive for at least some contexts, other alternative implementations having lower complexity are described below.

In deriving numerical results presented below, it proves convenient to first consider the link level performance in terms of the bit error rate versus received signal-to-interference ratio. Novel techniques are presented for calculating system level capacities and spectral efficiencies (measured in bits per second per Hertz per sector) by incorporating link level results with system level outage simulations. We thus determine system spectral efficiency as a function of various parameters (e.g., number of transmit antennas. transmit diversity order, random or orthogonal code transmission, same or different code transmission, number of receive antennas, type of receiver). To illustrate the applicability of present inventive architectures and applications of tradeoffs between and among parameter alternatives, some initial examples will be considered and illustrative results provided.

Example: Achieving High Spectral Efficiency (4 bps/Hz Per Sector)

Consider an example with 4 transmit antennas per base station sector and 12 antennas per high-speed data receiver. Each receiver demodulates G=8 data substreams, each at the basic voice rate of 9.6 Kbps, to achieve a 76.8 Kbps rate. (We assume that no error correction coding is used; though those skilled in the art will adapt present teachings to include such error correction techniques as may be necessary or convenient.) Using orthogonal codes with spreading factor 128, a spectral efficiency greater than one is achieved by using the same code for each transmit antenna. Hence, for a given data user, only two orthogonal codes are used to spread 8 substreams over the four transmit antennas. A total of 64 users per 120-degree sector can be supported in a 1.25 MHz band. The resulting spectral efficiency (64×76.8 Kbps/ 1.25 MHz=4 bps/Hz per sector) is an order of magnitude more than that of a conventional (single-antenna) voice CDMA system (about 20 users per sector, or 20×9.6 Kbps/ 1.25 MHz=0.15 bps/Hz per sector).

Example: Achieving 384 Kbps Per Data User in a Mixed Traffic Environment

For a second example, we again assume that the data transmitter and receivers use, respectively, 4 and 12 antennas. However, now we consider a mixed rate system where voice users, each with a single antenna, operate in the sector along with data users, each of whom now demodulate G=40 channels to achieve 384 Kbps. If we fix the number of voice users at 8, an illustrative system will support 7 high-speed data users per sector using the same-code transmission technique. A higher spectral efficiency can be achieved if we restrict the location of the data users. For example, if data users are restricted to be within a distance R/3 from the base station (where R is the radius of the cell), then 12 data users at 384 Kbps can be supported using only 4 antennas each along with 8 voice users (who are not restricted in their location).

Achieving high spectral efficiencies such as those described in the preceding examples requires mobile receivers with sufficient space to place multiple uncorrelated antennas and sufficient computational power to implement the space-time multi-user detection algorithms. In one application of current inventive principles, these receivers may be laptop computers with an array of patch antennas on the backs of their respective screens.

Introduction to System Architecture and Operations

We make a number of reasonable simplifying assumptions to keep the level of complexity manageable in the following detailed description. For data users, we assume long data packets (in relation to the voice activity factor), so that we can model the data activity factor as one. We assume uniform rates for data users. We assume ideal muitipath timing and channel estimation at the receiver for space-time rake combining. We assume perfect acquisition of the codes, frequency offset correction, and gain control. Despite these assumptions, resulting models are sufficiently complete to provide fundamental insights into system design when using multiple transmit and receive antennas.

Transmission Techniques

This section presents a description of a family of transmission techniques using multiple antennas.

The base station transmitter, e.g., 100 in FIG. 1, has three resources: spreading codes, antennas, and power. A system design goal is to allocate these resources efficiently among $K_d$ high-speed data users and $K_v$ voice users in a manner that minimizes interference and maximizes system capacity. We assume that there are M transmit antennas at the base station indexed by m=1 . . . M. High-speed data transmissions are achieved by demultiplexing the high speed data stream into G data substreams. Each substream is then transmitted with a spreading factor N. (Those skilled in the art will recognize that present inventive techniques may be adapted by employing variable spreading gain and higher order data modulations.) The voice data is also transmitted with a spreading factor of N. We now describe a general formulation characterizing ways in which the G data substreams of each user can be spread and transmitted over one or more of the M antennas.

Two parameters used to describe a transmission strategy in accordance with one aspect of the present invention are C, the number of substreams modulated per spreading code, and $M_t$, the transmit diversity order. In conventional CDMA transmission, a unique code would be used to modulate each substream. In this case, C=1.

Figures 2, 3, 4, 5:
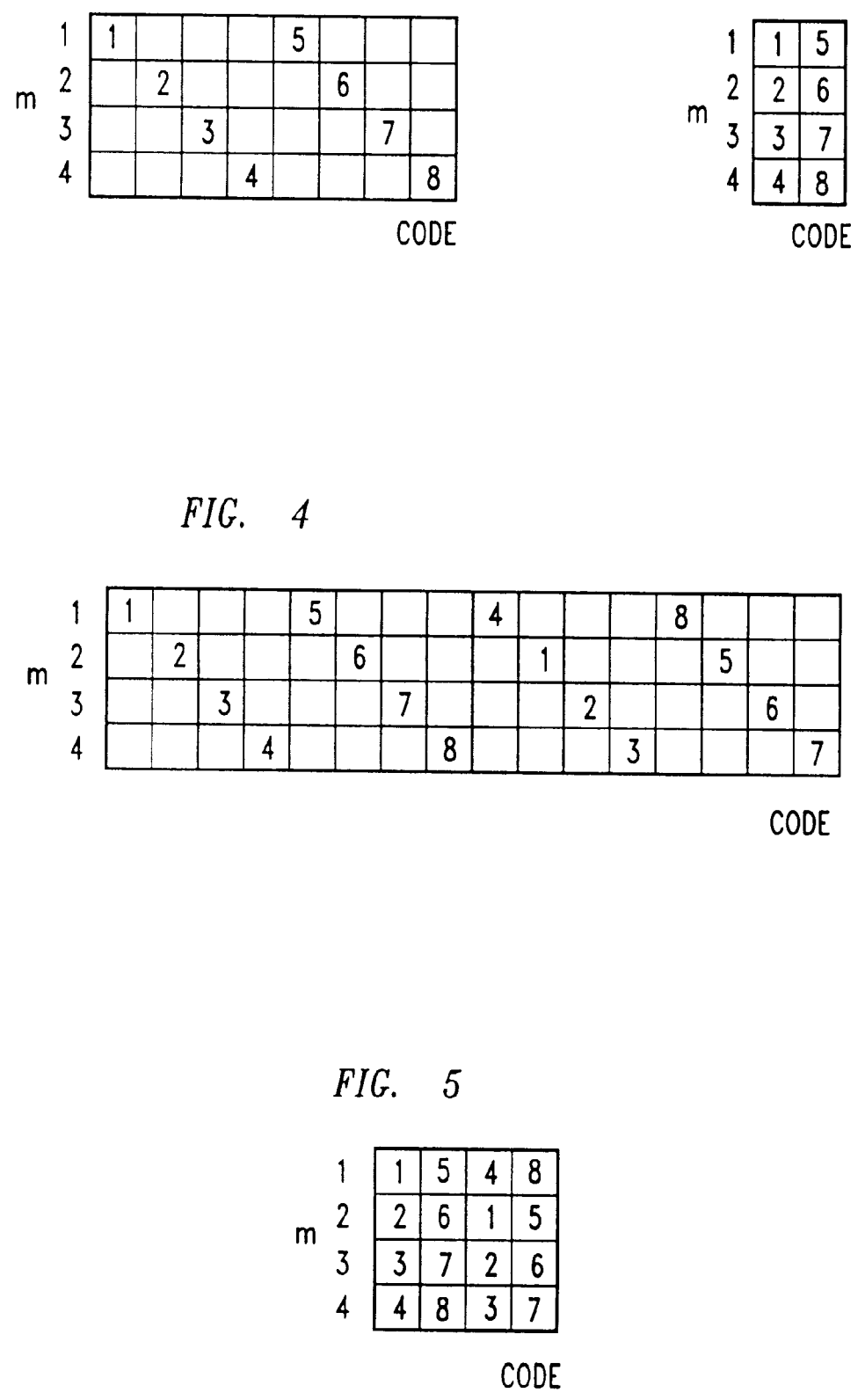

As an example, FIG. 2 shows the code and antenna assignments for a transmitting 8 substreams out of 4 antennas. The assignment of the substreams to high data rate streams is arbitrary from the point of view of the code spreading. In other words, the substreams could have been derived from one to 8 data streams. Substream 1 is transmitted from antenna m=1 using the code corresponding to the first column. Substream 2 is transmitted from antenna m=2 using the code corresponding to the second column, and so on through substream 4. Substreams 5 through 8 are transmitted from antennas 1 through 4, respectively, and are spread using unique codes. Hence 8 codes are used for 8 substreams, and C=1. Note that one could have transmitted all 8 substreams from a single antenna.

If orthogonal codes are used, maximum spectral efficiency is achieved when all of the orthogonal codes are employed. For example, with a spreading factor of N, there are N orthogonal codes. If a BPSK constellation is used for all substreams, each substream yields 1/N bits per second per Hertz. If one uses all N codes, the total spectral efficiency is 1 bit per second per Hertz. Note that the maximum spectral efficiency depends only on the constellation size and not on the spreading factor N.

To increase spectral efficiency in accordance with one aspect of illustrative embodiments of the present invention, we reuse each spreading code so that independent substreams are transmitted from different antennas but are spread using the same code. In FIG. 3 for example, the code designated by the first column is used to spread substreams 1 through 4. These are then transmitted from antennas 1 through 4, respectively. Substreams 5 through 8 are spread using the code designated by the second column and are transmitted from antennas 1 through 4, respectively. Since only two codes are used to spread 8 substreams, C=4.

In order to distinguish the substreams spread with the same code, the receiver advantageously relies on spatial characteristics of those signals. Later, we will see how this is done using multiple receive antennas. In reusing each spreading code C=4 times, the maximum spectral efficiency is now 4 times that of the first example. This is achieved by reusing all spreading codes C=M times. Alternatively, we could choose to reuse only a subset of the orthogonal codes or choose a code reuse factor less than M. For simplicity of description, we consider only the extreme cases of C=1 and C=M for the remainder of the paper—though less extreme cases will be employed to advantage in particular cases. We designate these extreme cases as different code and same code transmission, respectively.

So far, we have shown how spectral efficiency can be increased by reusing spreading codes. Spreading codes can also be used to improve link performance and protection against channel fading via transmit diversity. Transmit diversity can be achieved in many different ways, but we focus on two illustrative techniques. The first is code transmit diversity and is achieved by spreading a given substream with $M_t$ spreading codes and transmitting the resulting signals from $M_t$ antennas. If the spreading codes are mutually orthogonal, and the channels are flat fading and independent, then order $M_t$ transmit diversity is achieved. FIG. 4 shows a transmission scheme with C=1 and $M_t$=2. FIG. 5 shows a transmission scheme with C=4 and $M_t$=2.

It will be noted that in the definition of C, the substreams counted for each code need not be unique. Note also that by using code transmit diversity, if each substream is transmitted $M_t$ times, the maximum spectral efficiency is reduced by a factor of $M_t$, independent of C. Hence increasing $M_t$ using code transmit diversity improves the link performance but reduces the maximum spectral efficiency.

For the special case of $M_t$=2, an alternative transmit diversity technique known as space-time spreading improves link performance without using extra codes and hence does not reduce the maximum spectral efficiency. See, for example, B. Hochwald, T. Marzetta, C. Papadias, "A Novel Space-Time Spreading Scheme for Wireless CDMA Systems," 37th annual Allerton Conference on Communication, Control, and Computing, Urbana, Ill., Sep. 22–24, 1999. Using M=2 antennas, the transmitted signals from the two antennas are given by $$t_1=(s_1b_1+s_2b^*_2+\ldots+s_7b_7+s_8b^*_8)/\sqrt{2}$$

$$t_2=(s_1b_2-s_2b^*_1+\ldots+s_7b_8-s_8b^*_7)/\sqrt{2}$$

where $s_k$ is the kth spreading code, $b_k$ is the symbol selected from a complex-valued constellation for kth data substream, and * represents complex conjugate. Note that the signals are normalized in power so that the total transmitted power is the same as the C=1 $M_t$=1 case. If the channel is frequency non-selective, and if the channels between the antennas are statistically independent, then transmit diversity order $M_t$=2 can be achieved by using a simple matched filter receiver. However, since 8 codes were used for 8 substreams, this transmit diversity gain was achieved without using extra codes with respect to the conventional C=1 $M_t$=1 transmission.

Space-time spreading can be used in conjunction with code reuse. For example, with M=4 antennas, transmit diversity order $M_t$=2 can be achieved with 4 codes for 8 substreams using the following transmission scheme:

$$t_1=(s_1b_1+s_2b^*_2+s_3b_5+s_4b^*_6)/\sqrt{4}$$

$$t_2=(s_1b_2-s_2b^*_1+s_3b_6-s_4b^*_5)/\sqrt{4}$$

$$t_3=(s_1b_3+s_2b^*_4+s_3b_7+s_4b^*_8)/\sqrt{4}$$

$$t_4=(s_1b_4-s_2b^*_3+s_3b_8-s_4b^*_7)/\sqrt{4}$$

In this case the number of substreams per spreading code is C=2, and the maximum achievable spectral efficiency is the same as that for C=2 $M_t$=1 transmission.

There are of course other techniques one can use to achieve transmit diversity gains. The preceding description focused on code transmit diversity and space-time spreading to highlight the tradeoffs between code reuse and spectral efficiency.

In contrast with orthogonal codes, there are no limits on the number of random binary codes for a given spreading factor N; hence there is no corresponding maximum spectral efficiency. However, as we will see in the section on numerical results below, the number of codes may be limited by the rank of the code correlation matrix.

For a mixed traffic system with voice and data users, the voice signals are all transmitted out of antenna m=1, and the data signals are transmitted using the schemes described above.

Received Signal Model and System Assumptions

We now consider the complex baseband received signal at one of the $K_d$ high-speed user's receiver. Each high-speed data user has a P antenna receiver for demodulating its G substreams. The $K_d$G data substreams are transmitted out of M antennas, where the antenna assignment for a user's substream is given by (1). We assume that the voice signals are transmitted from antenna m=1. The complex baseband received signal for a mobile user at its pth (p=1 . . . P) antenna is:

$$r_p(t) = \sum_{g=1}^{G}\sum_{l=1}^{L}\sum_{m_t=1}^{M_t}\sum_{k=1}^{K_d} c_{m(g,m_t),l,p} \quad (4)$$

$$\frac{A_k}{\sqrt{M_t}}s_{k,g,m_t}(t-\tau_{m,l})b_{k,g}(t-\tau_{m,l})+$$

$$\sum_{l=1}^{L}\sum_{j=1}^{K_d} c_{1,l,p}A_j^{(v)}s_j^{(v)}(t-\tau_{1,l})b_j^{(v)}(t-\tau l, l)+n_p(t)$$

where
G is the number of independent substreams for each high-speed data user.

L is the number of resolvable multipaths for a given transmitted signal.

$c_{m(g,m_t),l,p}$ is the complex channel amplitude between the mth transmit antenna and the pth receive antenna over the lth multipath. The choice of the transmit antenna m is given by (1) and is independent of the user index k.

$K_d$ is the number of high speed data users, each demodulating G data streams.

$A_k$ is the amplitude of the kth high-speed data user, chosen to satisfy the required Eb/No (received bit energy/noise power).

$s_{k,g,m_t}(t)$ is the binary spreading code for the $m_t$th transmission of the kth user's gth substream. The uniqueness of a user's codes depends on the transmission technique (same or different code), and the associated transmit antenna depends on the assignment given by (1).

$\tau_{m,l}$ is the delay of the lth multipath from the mth transmit antenna, where the antenna is a given by (1).

$b_{k,g}(t)$ is the data stream for the kth user's gth substream. We assume BPSK modulation.

$K_v$ is the number of voice users.

$A_j^{(v)}$ is the amplitude of the jth voice user.

$s_j^{(v)}(t)$ is the real spreading code for the jth voice user.

$b_j^{(v)}(t)$ is the data stream for the jth voice user.

$n_p(t)$ is the additive white Gaussian noise at the pth receive antenna that accounts for other cell interference and thermal noise.

Note that all the substreams corresponding to a given data user have the same transmit power. We determine the system capacities assuming that the total base station power is the limiting factor. We make the following assumptions for simplifying the received signal.

1. The signals from the M antennas arrive at the pth receive antenna with the identical timings. In other words, for fixed l, $\tau_{1,l}=\tau_{2,l}=\ldots=\tau_{M,l}$, and codes which are orthogonal at the transmitter retain their orthogonality at the receiver.

2. Since the data and voice signals are transmitted from the same source, we will assume that the symbol intervals for each of the users (and substreams) are aligned. Hence, if we write the received signal (4) over a given symbol period, the data $b_{k,g}$ is not a function of time.

3. Each of the data substreams and voice signals is transmitted at the same data rate R using length N spreading codes. The spreading codes are normalized to have unit energy. In other words, letting T be the symbol (bit) interval time, if we integrate over a symbol interval T, we have $\int_0^T |s_{k,m}(t)|^2 dt=1$.

4. The channel is assumed to be fixed over the duration of the symbol and assumed to be known at the receiver. In other words,,we assume that the detectors will have perfect estimates of $C_{m,l,p}$. Channel (and timing) estimates can be obtained from auxiliary pilot or training signals. The channel is also assumed to be fast fading in the sense that channel coefficients are independent from symbol to symbol. This corresponds to a mobile scenario. This assumption is made primarily for the ease of capacity calculation in a mixed voice and data environment. Capacity results obtained for this scenario will generally reflect capacity improvements that will also be achieved for static data terminals.

5. The channel amplitudes are independent, zero-mean proper complex Gaussian random variables with unit variance. In other words, for a given l, $$E\left(c^*_{m_1,l,p_1} c_{m_2,l,p_2}\right) = \begin{cases} 0 & \text{if } m_1 \neq m_2 \text{ or } p_1 \neq p_2 \\ 1 & \text{if } m_1 = m_2 \text{ and } p_1 = p_2 \end{cases} \quad (5)$$

where * denotes the complex conjugate.

6. We assume that each of the L resolvable, delayed multipath components are separated by at least a chip period from the nearest one. Then the spreading codes for each component are uncorrelated. Furthermore, if we assume the symbol interval T is large with respect to the delay spread, we can ignore the ISI and model the L components for a code as L independent random codes.

Under these assumptions, the baseband received signal in (4) for a given symbol period can be rewritten as $$r_p(t) = \sum_{g=1}^{G} \sum_{l=1}^{L} \sum_{m_t=1}^{M_t} \sum_{k=1}^{K_d} c_{m(g,m_1),l,p} \frac{A_k}{\sqrt{M_t}} s_{k,g,m_t}(t-\tau_l) b_{k,g} + \sum_{l=1}^{L} \sum_{j=1}^{K_d} c_{1,l,p} A_j^{(v)} s_j^{(v)}(t-\tau_l) b_j^{(v)} + n_p(t) \quad (6)$$

From assumption 6, we can then denote the L spreading codes at the output of a chip matched filter for user k as N-vectors $s_{k,g,1}, s_{k,g,2}, \ldots s_{k,g,L}$ corresponding respectively to $s_{k,g}(t-\tau_{g,1}), s_{k,g}(t-\tau_{g,2}), \ldots, s_{k,g}(t-\tau_{g,L})$. Likewise for the jth voice user's spreading code, we let $s_{j,1}^{(v)}, \ldots s_{j,L}^{(v)}$ correspond to $s_j^{(v)}(t-\tau_1), \ldots, s_j^{(v)}(t-\tau_L)$. The chip matched filter output of (6) can be expressed by $$r_p = [S_d S_v] \begin{bmatrix} I_{K_d} \otimes C_p & \\ & I_{K_r} \otimes c_{1,p} \end{bmatrix} A \begin{bmatrix} b_d \\ b_d \end{bmatrix} + n_p \quad (7)$$

where $r_p$ is a complex N-vector $S_d$ is the real N-by-$K_d G M_t L$ data spreading code matrix $S_d \triangleq [S_{1,1} \ldots S_{1,G} \ldots S_{K_d,1} \ldots S_{K_d,G}]$ given by the $K_d G$ code matrices, each of which are size N-by-$M_t L$. The code matrix for the kth user's gth substream is $S_{k,g} \triangleq [s_{k,g,1,1} \ldots s_{k,g,1,L} \ldots s_{k,g,M_t,1} \ldots s_{k,g,M_t,L}]$.

$S_v$ the real N-by-$K_v L$ voice spreading code matrix defined by $S_v = [s_{1,1}^{(v)} \ldots s_{1,L}^{(v)} \ldots s_{K_v,1}^{(v)} \ldots s_{K_v,L}^{(v)}]$.

$C_p$ is the complex $G M_t L$-by-G matrix defined by $$C_p \triangleq \text{diag}\left( \begin{bmatrix} c_{m(1,1),p} \\ \vdots \\ c_{m(1,M_t),p} \end{bmatrix}, \ldots, \begin{bmatrix} c_{m(G,1),p} \\ \vdots \\ c_{m(G,M_t),p} \end{bmatrix} \right)$$

where, in turn, $c_{m(g,m_t),p}$ is the complex L-vector corresponding to the multipath channels between transmit antenna m and the recieve antenna $$p: c_{m(g,m_t),p} \triangleq \begin{bmatrix} c_{m,p,1} \\ \vdots \\ c_{m,p,L} \end{bmatrix}.$$

$I_x$ is the x-by-x identity matrix. The operator $\otimes$ denotes the Kronecker product. Hence $I_{kj} \otimes C_p$ is a block diagonal $K_d G M_t L$-by-$K_d G$ matrix diag($C_p, \ldots, C_p$) and $I_{K_d} \otimes c_{1,p}$ is a block diagonal diag ($\tilde{C}_p, \ldots, \tilde{C}_p$) and $I_{K_v} \otimes C_{1,p}$ is a block diagonal $K_v L$-by-$K_v$ matrix diag ($c_{1,p}, \ldots, c_{1,p}$).

A is a $K_d G + K_v$-by-$K_d G + K_v$ diagonal matrix of amplitudes defined by $$A \triangleq \text{diag}\left( \frac{A_1}{\sqrt{M_t}} \otimes I_G, \cdots, \frac{A_{K_d}}{\sqrt{M_t}} \otimes I_G, A_1^{(v)}, \cdots A_{K_v}^{(v)} \right).$$

$b_d$ is the real $K_d G$ bit vector for the data users defined by $b_d \triangleq [b_{1,1} \ldots b_{1,G} \ldots b_{K_d,1} \ldots b_{K_d,G}]^T$.

$b_v$ is the real $K_v$ bit vector for the voice users defined by $b_v \triangleq [b_1 \ldots b_{K_v}]^T$.

$n_p$ is the zero-mean complex (circularly symmetric) Gaussian noise N-vector with i.i.d. components whose real and imaginary components each have variance $\sigma^2$.

Finally, if we define $$S \triangleq [S_d \ S_v], \tilde{C}_p \triangleq \begin{bmatrix} I_{K_d} \otimes C_p & \\ & I_{K_v} \otimes c_{1,p} \end{bmatrix}, \text{ and } b \triangleq \begin{bmatrix} b_d \\ b_v \end{bmatrix},$$

we can rewrite (7) simply as $$r_p = S\tilde{C}_p AB + n_p. \quad (8)$$

Detection Techniques

In this section we describe multiple antenna space-time detectors that account for in-sector interference.

A jointly optimum detector for received signals of the type described in the preceding section is the maximum likelihood space-time multi-user detector that jointly detects all $GK_d + K_v$ substreams. See, for example, R. Kohno. N. Ishii. and M. Nagatsuka, "A spatially and temporally optimal multi-user receiver using an array antenna for DS/CDMA," *Proc. IEEE Int. Symp. on Personal, Indoor and Mobile Radio Communications*, 3:950–954, September 1995. Because the complexity of this detector is exponential with respect to the number of substreams, we are motivated to investigate useful sub-optimal detectors having lower complexity. Such sub-optimal detectors include decorrelating detectors, and the decorrelating decision feedback (V-BLAST) group detector described, for example, in the Woliansky, et al paper, supra.

Before we describe these detectors, it proves worthwhile to review the maximum likelihood space-time multi-user detector in order to see how to obtain the sufficient statistics used in each of the suboptimum detectors. Accordingly, given the received signal (8), we acquire a sufficient statistic vector for the $GK_d + K_v$ channels by performing matched filtering with respect to the codes and channel coefficients. Such matched filtering involves first processing the received signal from each of the P antennas by a bank of filters matched to the L multipath replicas of each of the $GK_d + K_v$ spreading codes. The code matched filter output for the pth antenna is simply $S^T r_p$ where T denotes the matrix transpose. The components of this $(GK_d M_t + K_v)L$ vector are then weighted by the complex conjugate of the corresponding channel coefficient $C^*_{m,p,l}$. Then the resulting $M_t LP$ and LP products for, respectively, each of the $GK_d$ data substreams and $K_v$ voice channels are summed together to create a complex $GK_d + K_v$-vector. Since the data is binary valued, we then take the real component of each element to obtain the sufficient statistic vectory. Using the received signal notation in (8), we can write $$y = \text{Re}\left[\sum_{p=1}^{P} \tilde{C}_p^H S^T r_p\right] \quad (9)$$

$$= \sum_{p=1}^{P} \text{Re}[\tilde{C}_p^H S^T S \tilde{C}_p^H] Ab + \sum_{p=1}^{P} \text{Re}[\tilde{C}_p^H S^T n_p]$$

$$= RAb + n$$

where $$R \triangleq \sum_{p=1}^{P} \text{Re}[\tilde{C}_p^H S^T S \tilde{C}_p] \quad (10)$$

is the $K_dG+K_v$-by-$K_dG+K_v$ space-time code correlation matrix, where the vector n is the real $K_dG+K_v$ Gaussian noise vector with covariance $\sigma^2 R$, and where the real operator on vectors and matrices is defined by $\text{Re}(x) \triangleq (x+x^*)/2$. The detection process used in generating the sufficient statistic vector y in (9) is the well-known space-time matched filter or 2-D rake receiver. The sufficient statistic y can be processed, as shown below with reference to FIG. 6, to obtain bit estimates for a desired user's $K_d$ data substreams.

Single Substream Detector

This is the conventional space-time matched filter detector that we consider for performance comparisons. The bit estimate for the kth substream (k=1 . . . $K_dG+K_v$) is the sign of the corresponding sufficient statistic component:

$$\hat{b}_k = sgn([y]_k) \quad (11)$$

where $[x]_k$ denotes the kth element of a vector x. Note that this detector requires knowledge of the desired substream's code, timing, and channel coefficients. It does not require knowledge of the other substreams. The corresponding bit error rate for the kth substream can be derived from (9), conditioned on the other user's bits and the channel coefficients. If we assume that the kth channel's data bit is $b_k=1$, the bit error rate conditioned on the channel and the other users' bits is $$P_k(\sigma) = Q\left(\frac{[Rab]_k}{\sigma}\right) \quad (12)$$

where Q(•) denotes the Q-function.

Decorrelating Detector

For this detector the matched filter output for a given channel is projected into the null space of the other $K_dG+K_v-1$ substreams. The bit estimate for the kth channel is the sign of the corresponding projected component:

$$\hat{b}_k = sgn([R^{-1}y]_k). \quad (13)$$

This detector requires the knowledge of all $K_dG+K_v$ substream codes. These codes will illustratively be transmitted to the receiver on an auxiliary control channel. The bit error rate for the kth substream is $$P_{k,m}(\sigma) = Q\left(\frac{A_k}{\sigma\sqrt{[R^{-1}]_{(k,k)}}}\right) \quad (14)$$

where $[X]_{(k,k)}$ denotes the kth diagonal element of matrix X.

Decorrelating Decision Feedback (V-BLAST) Group Detector

This detector achieves performance that is superior to that of the decorrelating detector by removing interference of strong interferers prior to decorrelation. It detects the $K_d$ substreams for a high-speed data user in groups of M (corresponding to a set of substreams transmitted over antennas m=1 . . . M) using a decorrelating decision feedback detector (as it is known to those skilled in the multi-user detection arts) or a V-BLAST detector (as it is sometimes known). In accordance with one aspect of such detectors, it proves advantageous to first jointly project the desired set of M substreams for a particular user into the null space of the remaining substreams. Note that this projection is less restrictive than the one for the decorrelating detector where there is no intra-user interference among the desired M substreams. With the group detector, there is still interference among these substreams which we untangle using a decorrelating decision feedback (V-BLAST) detector. For simplicity, we will focus on demodulating the first high-speed data user's first M substreams. The M-vector following the projection is given by $$z = [(R^{-1})_{[1:M,1:M]}]^{-1} [R^{-1}y]_{[1:m]} \quad (15)$$

where $[R^{-1}y]_{[1:M]}$ denotes the first M elements of the vector $R^{-1}y$, and $(R^{-1})_{[1:M,1:M]}$ denotes the upper-left M-by-M submatrix of $R^{-1}$. Hence this projection consists of two parts: a full decorrelation followed by a second combiner that essentially reintroduces the correlation for the desired M substreams. Letting $\tilde{R} \equiv [(R^{-1})_{[1:M,1:M]}]^{-1}$, we can rewrite (15) as $$z = \tilde{R}Ab + \tilde{n} \quad (16)$$

where $\tilde{n}$ is a Gaussian noise M-vector with covariance $\sigma^2 \tilde{R}$.

So, given z, we use a decorrelating decision feedback (V-BLAST) detector given by the following iterative algorithm.

Step 0—Initialization $$r_p(1) = r_p \quad (17)$$

$$X_p(1) = S\tilde{C}_p \quad (18)$$

$$y(1) = \sum_{p=1}^{P} \text{Re}[X_p^H(1)] r_p(1) \quad (19)$$

$$j=1 \quad (20)$$

In equation (19), y(1) is the space-time matched filter output and is equivalent to y given in (9)

Step 1—Detect the Strongest Substream $$R(j) = \sum_{p=1}^{P} \text{Re}[X_p^H(j) X_p(j)] \quad (21)$$

$$\tilde{R}(j) = [R^{-1}(j)_{[1:M-j+1,1:M-j+1]}]^{-1} \quad (22)$$

$$z(j) = [\tilde{R}(j)]^{-1}[R^{-1}(j)y(j)]_{[1:M-j+1]} \quad (23)$$

$$g(j) = \arg\min[\tilde{R}^{-1}(j)]_{(g,g)}, g=1, \ldots M-j+1 \quad (24)$$

$$\hat{b}_{g(j)} = sgn[\tilde{R}^{-1}(j)z(j)]_{g(j)} \quad (25)$$

The gth substream (g=1, . . . , M−j+1) selected in (24) is the one whose post-decorrelator signal-to-noise ratio is the highest, corresponding to the minimum among the first M−j+1 diagonal entries of $\tilde{R}^{-1}(j)$. This is the strongest of the remaining M−j+1 substreams which have not been removed in Step 2. A bit estimate for the gth substream is made in (25), and its signal is subtracted from the received signal in Step 2. It was shown in the above-cited Woliansky, et al paper that this localized strategy for selecting and removing substreams on the jth iteration is in fact the globally optimum strategy.

Step 2—Remove the Reconstructed Estimate of the Strongest Substream's Signal $$r_p(j+1) = r_p(j) - S_{1,g(j)} \begin{bmatrix} c_{m(g(j),1),p} \\ \vdots \\ c_{m(g(j),M_t),p} \end{bmatrix} A_1 \hat{b}_{g(j)} \quad (26)$$

$$X_p(j+1) = [X_p(j)]_{\overline{g(j)}} \quad (27)$$

$$y(j+1) = \sum_{p=1}^{P} X_p^H(j+1) r_p(j+1) \quad (28)$$

$$j = j+1$$

The L multipath signal components corresponding to substream g(j) are reconstructed and subtracted from the received signal in (26). In (27) the space-time matched filter matrix for antenna p on the next iteration $X_p$ (j+1) is obtained by striking out the L columns corresponding to the mth substream from current iteration.

Step 3—Go Back to Step 1 and Repeat Until All M Substreams Have Been Detected.

The bit error rate for the mth substream on iteration j is computed as a conditional bit error rate given the current received signal $r_p(j)$ as a function of the estimated bits $\hat{b}_{g(1)}$ ... $\hat{b}_{g(j-1)}$. This signal comprises the remaining substreams' signals, possibly a bias component caused by subtracting an improperly detected substream in (26), and a complex Gaussian noise vector component. The "non-noise" components of $r_p(j)$ are given by $$\sum_{p=1}^{P} \left( S\tilde{C}_p AB - \sum_{i=1}^{j-1} S_{1,g(i)} \begin{bmatrix} c_{m(g(i),1),p} \\ \vdots \\ c_{m(g(i),M_t),p} \end{bmatrix} A_1 \hat{b}_{1,g(i)} \right)$$

Following the matched filtering in (28) and decorrelation in (25), the g(j)th component of the "non-noise" vector is $$\left[ \tilde{R}^{-1}(j) \sum_{p=1}^{P} X_p^H(j) \left( S\tilde{C}_p AB - \sum_{i=1}^{j-1} S_{1,g(i)} \begin{bmatrix} c_{m(g(i),1),p} \\ \vdots \\ c_{m(g(i),M_t),p} \end{bmatrix} A_1 \hat{b}_{1,g(i)} \right) \right]_{(g(j))} \quad (29)$$

It can be shown that the post-decorrelator Gaussian noise vector is zero mean with covariance $\sigma^2 \tilde{R}^{-1}(j)$. Hence the conditional bit error rate for the gth substream, assuming the desired substream's data bit is one, is $$P_{1,g(j)}(\sigma) = Q \left( \frac{\left[ \tilde{R}^{-1}(j) \sum_{p=1}^{P} X_p^H(j) \left( S\tilde{C}_p AB - \sum_{i=1}^{j-1} S_{1,g(i)} \begin{bmatrix} c_{m(g(i),1),p} \\ \vdots \\ c_{m(g(i),M_t),p} \end{bmatrix} A_1 \hat{b}_{1,g(i)} \right) \right]_{(g(j))}}{\sigma \sqrt{[\tilde{R}^{-1}(j)]_{(g(j),g(j))}}} \right) \quad (30)$$

Note that if the bit decisions $\hat{b}_{g(1)} \ldots \hat{b}_{g(j-1)}$ are all correct, (30) reduces to $$P_{1,g(j)}(\sigma) = Q \left( \frac{A_1}{\sigma \sqrt{[\tilde{R}^{-1}(j)]_{(g(j),g(j))}}} \right)$$

which is the performance of a decorrelating detector with $K_d$ G−j+1 substreams.

It will be noted that the decorrelating detector and V-BLAST group detector described above account for the intra-cell interference using a linear projection. Alternatively, some applications or contexts will find it convenient to use a simpler detector that ignores intra-cell interference and only accounts for the intra-user interference corresponding to a user's G substreams. Such adaptations will collect sufficient statistic components only for a desired user's G substreams. The decorrelating detector then illustratively projects each channel into the null space of the other G−1 substreams, and the decorrelating decision feedback detector likewise illustratively operates on this reduced sufficient statistic vector. Of course one is not restricted in the type of detector used to account for inter-user interference. The decorrelating detector and decorrelating decision feedback detector are given as illustrative examples.

Capacity Analysis

In the following two sections we develop the technique for determining system capacity of a multiple antenna system with multi-user detection. In the next section we treat voice-only and data-only systems and in the second following section we deal with mixed voice and data contexts. Comparisons among the various detectors and parameter variations will be discussed below in the section Numerical Results.

Voice-only and Data-only Systems

The capacity analysis here bears some similarity to the approach in the Woliansky, et al. paper (cited above) for voice, but here we make modifications to account for multiple transmit and receive antennas and the fact that the data receivers use decorrelator detectors as opposed to the conventional single-user matched filter detectors. In this section we will focus on the technique for determining capacity.

We first discuss the outage curves required for both the voice-only and data-only systems. These curves are obtained by randomly distributing a given number of users in each sector of a multiple cell system (we use a 19 cell system with 2 tiers of cells for illustrative purposes), and then determining the probability that the received Eb/No does not meet the Eb/No requirement for all users. We assume that the cells are divided into three 120 degree sectors, that there is perfect sectorization at the base station (no sidelobe energy), and that there is no soft handoff. For the voice-only system the following bound on the received Eb/No was used in the cited Woliansky, et al paper for a single user matched filter detector:

$$\left(\frac{E_b}{N_o}\right)_{rx} \geq \frac{\beta S \phi \gamma_{k,1} N}{S\gamma_{k,1} + \sum_{b=2}^{19} S\gamma_{k,b} + N_o W} \quad (31)$$

where S is the maximum transmit power available at each base station, $\gamma_{k,b}$ is the shadow fading and path loss from base station b to user k which is communicating with cell 1 (the center cell), $\phi_k$ is the fraction of the total power available in base station 1 to each to user k, $N_o$ is the AWGN spectral density, W is the signal bandwidth, N is the spread factor, $\beta$ is he fraction of the base station power available for information, and $1-\beta$ is the fraction enoted to the pilot. Note that (31) is a lower bound for two reasons: first because the total power from base station 1 is treated as in-cell interference, and second because the activity factor of the users would reduce the average interference power.

For the data system the received Eb/No (following the code matched filters and channel combiner but prior to antenna combining) is given by $$\left(\frac{E_b}{N_o}\right)_{rx} = \frac{\beta S \phi_k \gamma_{k,1} N}{\sum_{b=2}^{19} S\gamma_{k,b} + N_o W} \quad (32)$$

Here $\phi_k$ is the fraction of the total power available in base station 1 to each substream of user k. The above equation applies to each individual substream of each data user and is justified as follows. The denominator term includes the interference and noise terms. The interference term consists only of the out-of-cell interference unlike (31). For the data users a decorrelating detector is used at the front end; hence the in-cell interference is ignored in the outage analysis since it is considered in the BER analysis to derive the target Eb/No. The various interference terms are weighted by the appropriate shadow fading factors. Note that the above equation is independent of the number of transmit and receive antennas since the received Eb/No is measured prior to combining among the P receive antennas. Since all the substreams of a given user are demodulated at the same location, each one requires the same transmit power level. Hence the total transmit power to user k for G substreams is $G\phi_k$. Note that we have assumed the worst-case scenario of all neighboring base stations being fully loaded-they all transmit at fall power.

For successful decoding of the received signal the received Eb/No has to be larger than the Eb/No required to meet the target BER. The base station can choose the power fractions $\phi_k(G\phi_k)$ to each voice (data) user just sufficiently large to meet the Eb/No requirement so as to support as many voice (data) users as possible subject to the total power constraint $$\sum_{k=1}^{K_v} \chi_k \phi_k \leq 1 \left( \sum_{k=1}^{K_d} \chi_k G\phi_k \leq 1 \right)$$

where $\chi_k$ is an indicator function defined by $$\chi_k = \begin{cases} 1 & \text{with probability } \alpha_v \text{ (data: } \alpha_d) \\ 0 & \text{with probability} 1 - \alpha_v \text{ (data: } 1 - \alpha_v) \end{cases}$$

where $\alpha_v(\alpha_d)$ is the voice (data) activity factor. An outage event is said to occur if for a given number of users K. it is not possible for all the users to meet their Eb/No requirement, i.e., to satisfy the condition $(E_b/N_o)_{rx} \geq (E_b/N_o)_{req}$. The outage probability is therefore $$\Pr\left\{ \sum_{k=1}^{K_v} \chi_k \phi_k > 1 \right\}.$$

We assume perfect power control so that each user receives just enough power to meet its Eb/No requirement, i.e. $(E_b/N_o)_{rx} = (E_b/N_o)_{req}$. For the voice users we have from (31), $$\phi_k \leq \frac{(E_b/N_o)_{req}}{\beta N}\left(1 + \sum_{b=2}^{19} \frac{\gamma_{k,b}}{\gamma_{k,1}} + \frac{N_o W}{S\gamma_{k,1}}\right) \triangleq f_{v,k}. \quad (33)$$

An upper bound for the outage probability is therefore given by $$\Pr\left\{ \sum_{k=1}^{K_v} \chi_k \phi_k > 1 \right\} \leq \Pr\left\{ \sum_{k=1}^{K_v} \chi_k f_{v,k} > 1 \right\}. \quad (34)$$

To determine the capacity from the outage curves, we must determine the required Eb/No, which in turn depends on the target BER. For the voice system, since all the terminals use the single-user matched filter detector, both the in-cell and out-of-cell interference is treated as Gaussian noise and hence the required Eb/No can be obtained from the BER performance of a single user in AWGN. An Eb/No required of 7 dB is sufficient to guarantee the target BER of 0.001. Using (34) and Monte Carlo simulations over random shadow fading, user locations, and activity indicators, for N=128, $\beta$=0.8, and $\alpha_v$=⅜ the outage curve for a voice only system is given in FIG. 7. (In all numerical results, we assume the absence of thermal noise: $N_o$=0.) Hence at a BER of 0.001, a voice-only system can support about 20 users at a 0.01 outage probability, and the resulting spectral efficiency is 20/128=0.156 bps/Hz per sector.

Returning to the outage calculation for data users, we have from (32)

$$\phi_k \leq \frac{(E_b/N_o)_{req}}{\beta N}\left(\sum_{b=2}^{19} \frac{\gamma_{k,b}}{\gamma_{k,1}} + \frac{N_o W}{S\gamma_{k,1}}\right) \triangleq f_{d,k}. \quad (35)$$

and the outage probability is thus $$\Pr\left\{ \sum_{k=1}^{K_d} \chi_k G\phi_k > 1 \right\} = \Pr\left\{ \sum_{k=1}^{K_d} \chi_k G f_{d,k} > 1 \right\}. \quad (36)$$

Figure 8:
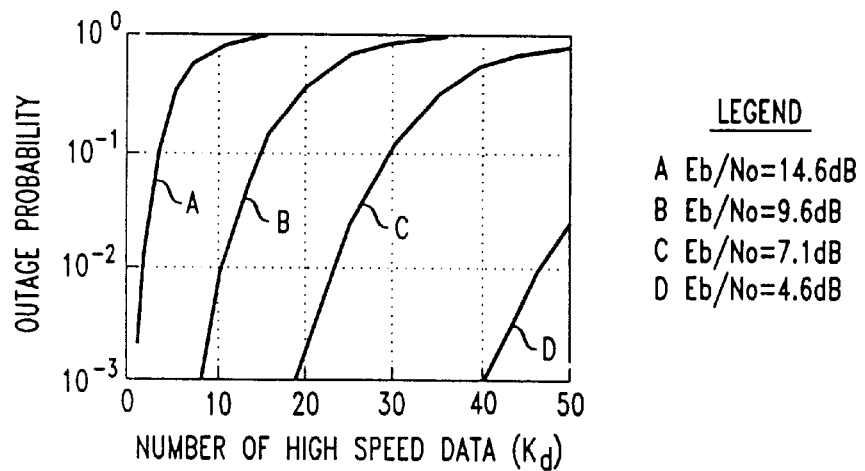
FIG. 8. shows illustrative outage curves for an illustrative data-only system ($\alpha=1$).

For the high speed data systems, determining the BER performance, the required Eb/No and the corresponding system capacity is not as trivial. This is because the data terminals use multi-user detectors, and the required Eb/No is now a function of the number of users. As a consequence, we cannot simply fix the required Eb/No as we did for the voice-only system. FIG. 8 shows the outage curves for a data-only system (G=1) where the curves are parameterized by the received Eb/No. We have modeled the data as very long packets so that the activity factor is $\alpha_d=1$.

To determine the required Eb/No to achieve the target BER, we need the BER of the multi-user detector as a function of Eb/No and $K_d$. In this context the Eb/No corresponding to (32) is given as $A^2/2\sigma^2$. This is the signal-to-noise ratio after despreading, multipath combining and transmit diversity combining but prior to receive diversity combining. The additive noise np in BER calculation plays the role of out-of-cell interference and thermal noise.

Note that in the case of a decorrelating detector the BER does not depend on the received power levels of the interfering users. Hence the calculation of the BER can be independent of the power control scheme used. FIG. 8 shows the BER versus Eb/No for K=2, 16, 32, 48 users, L=2, M=1, P=4, using orthogonal same code transmission and the decorrelator detector. The spreading factor is N=128, and the BERs are obtained by averaging (14) or (30) over random channel realizations and user bits.

Figure 7:
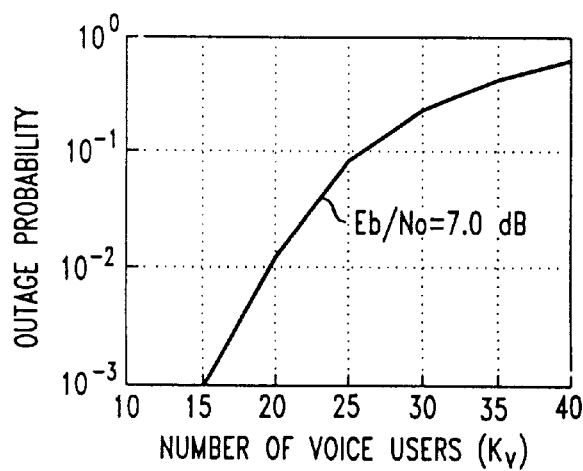
FIG. 7. shows an illustrative outage curve for an illustrative voice-only system ($\alpha=3/8$).
Figure 9:
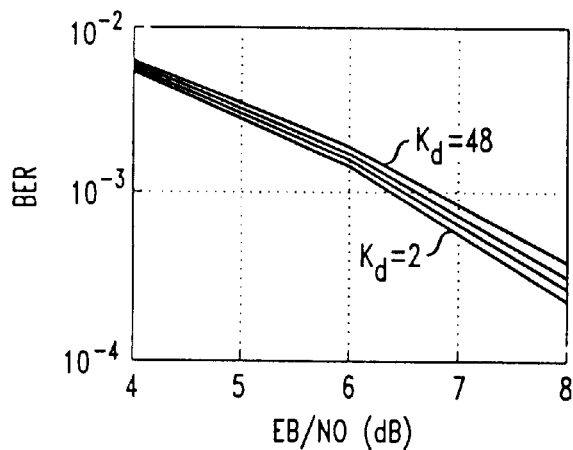
FIG. 9. shows illustrative BER curves for data users.
Figure 10:
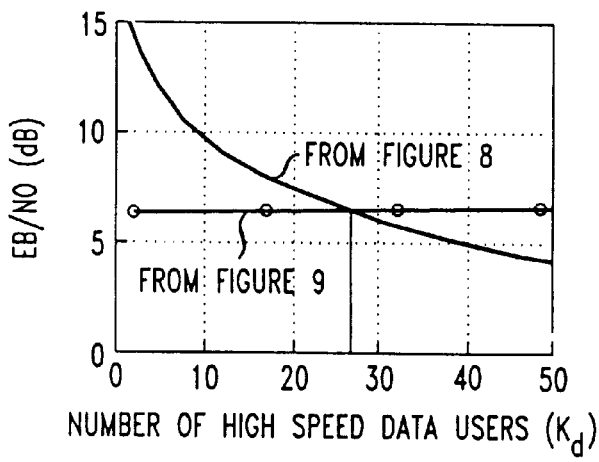
FIG. 10. illustrates a technique for determining system capacity using results based on information of a type derived from FIGS. 8 and 9.

From the outage curves in FIG. 7, we can plot in FIG. 9 the received Eb/No versus $K_d$ for a given outage rate (0.01). From the BER curves in FIG. 8, we plot on the same axes in FIG. 9 the required Eb/No versus $K_d$ for a given BER rate (0.001). The resulting system capacity is then the value of $K_d$ at which the two curves intersect ($K_d$=27). In the numerical analysis, linear interpolation is used to find this intersection. Note that from the BER curves. $K_d$ monotonically decreases with increasing Eb/No and from the outage curves, $K_d$ monotonically increases. Given $K_d$, the spectral efficiency is the total sector throughput per bandwidth:

$$SE = \frac{K_d G R}{W} = \frac{K_d G}{N} \qquad (37)$$

For orthogonal same-code transmission, the code-limited spectral efficiency can be computed using $K_{d,max}$ from (2) in (37): $SE_{max}=M/M_t$. For orthogonal different-code transmission, the code-limited spectral efficiency is obtained from $K_{d,max}$ in (3): $SE_{max}=1/M_t$.

Mixed Voice and Data Analysis

Mixed voice and data systems in accordance with present inventive teachings are desirably backward compatible—in the sense that voice users should be unaffected by the presence of data users. Furthermore, voice terminals will have only a single receive antenna and will only use matched filter detection. As described above, voice is advantageously transmitted over only a single transmit antenna. The data terminals will have sufficient processing power to implement a decorrelating V-BLAST type multi-user detector for in-cell interference. The capacity analysis for mixed voice and data systems is similar to that presented in the previous section; the following presents relevant changes.

The outage probability for mixed systems depends on both the voice and data users meeting the target Eb/No required. The received Eb/No for the kth voice user is given by the bound in (31) and that for kth data user is given by (32). Recall that for voice users, the in-cell interference is included in the denominator since voice terminals use matched filter detectors while for data users we do not include in-cell interference since they use multi-user detectors. An outage event would occur if any of the voice users or any of the data streams of any data user cannot meet the Eb/No requirement. The total power constraint is now given by $$\sum_{j=1}^{K_v} \chi_j \phi_j + \sum_{i=1}^{K_d} \chi_i G \phi_i \leq 1.$$

Hence from (33) and (35), a bound on the outage probability is given by $$\Pr\left\{\sum_{j=1}^{K_v} \chi_j \phi_j + \sum_{i=1}^{K_d} \chi_i G \phi_i > 1\right\} \leq \Pr\left\{\sum_{j=1}^{K_v} \chi_j f_{v,j} + \sum_{i=1}^{K_d} \chi_i G f_{d,i} > 1\right\}. \qquad (38)$$

The outage probability is thus a function of both $K_v$ and $K_d$. For our numerical results, we fix the number of voice users $K_v$ at a value below the maximum number of voice users that can be supported and determine the outage curves as a function of number of data users parameterized by the data Eb/No required. (Illustratively, the maximum number is twenty and we set $K_v$=8.) The required Eb/No the voice terminals remains the same in the mixed environment since the voice terminals use single user matched filters whose performance depends only on the total interference power independent of whether the interference is from a data or a voice terminal. Hence we set the Eb/No required for voice to be 7 dB. However, for data terminals the BER performance depends on the number of voice users. The BER performance for the data users is obtained by simulations in a mixed voice and data environment. We fix the number of voice users and determine the BER curves for the data users parameterized by $K_d$, M, $M_t$, L, and P.

The capacity is then obtained from the BER curves and the outage curves as discussed in the previous section. The spectral efficiency is derived from the combined achievable data rate of the voice and data users:

$$SE = \frac{(K_d G + K_v) R}{W} = \frac{K_d G + K_v}{N} \qquad (39)$$

Numerical Results

The next following sections disclose relevant numerical results for a variety of particular contexts.

Outage Probabilities Versus Number of Users

Figure 11:
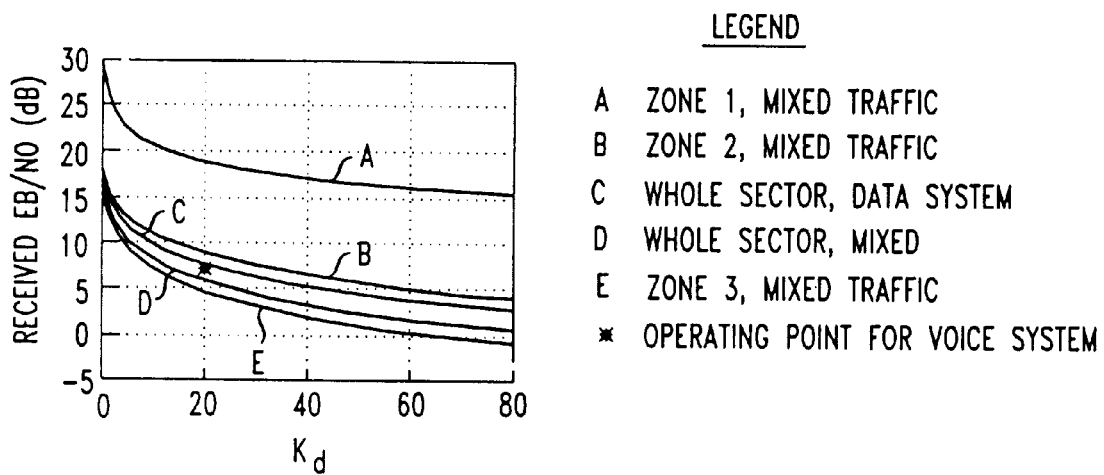
FIG. 11 shows the received Eb/No at 1% outage rate versus the number of users for G=1 and M=1 and for various configurations.

FIG. 11 shows the received Eb/No at 1% outage rate versus the number of users for G=1 and M=1 and for various configurations. These curves are generated using the capacity analysis techniques from the sections for one-type and mixed capacities. They show the received Eb/No decreases as the number of users increases, and it decreases more rapidly when there are fewer users. We considered a data only system and a mixed traffic system with voice and data. For the data only system, we assume that the mobiles are distributed uniformly over the entire sector. The corresponding data-only spectral efficiencies are discussed in the section entitled Spectral efficiency for the data-only scenario. For the mixed traffic system, we consider uniform distribution over the entire sector and uniform distribution in each of three zones. Letting r be the radius of the hexagonal cell (measured from center to edge), Zone 1 corresponds to a radius of 0 to r/3. Zone 2 corresponds to a radius of r/3 to 2r/3, and Zone 3 corresponds to the remaining area. The outage curves for the three zones are generated from the received Eb/No statistics of users uniformly distributed within the respective zones. The corresponding spectral efficiencies for the mixed-traffic whole-sector and three zone cases are discussed in sections entitled Spectral efficiencies for the mixed traffic scenario and Location dependent spectral efficiencies for mixed traffic, respectively.

In general, we need to adjust the outage curves in FIG. 11 to account for G'≠1. From (35) and (36), we observe that the outage probability is a function of $G(E_b/N_o)_{rx}=G(E_b/N_o)_{req}$. Hence for a fixed $K_d$ in FIG. 11, the received Eb/No for G'≠1 is simply the received Eb/No in FIG. 11 (for G=1) divided by G'. This corresponds to a downward shift of the curves by $10 \log_{10} G'$ dB.

We could have also plotted an outage curve for the whole-sector voice-only system derived from (8). This curve would pass through the point with 20 users at 7dB Eb/No. The difference between this curve and the whole-sector data-only curve are due to 1) the activity factor (⅜ versus 1) and 2) the detector used (conventional versus multi-user, as reflected in (14) versus (30)). Starting from the imagined voice-only curve, increasing the activity factor would shift the curve downwards while using a multi-user detector would shift the curve upwards. The fact that the data-only curve passes just above the 20 user 7 dB Eb/No point indicates that the benefits of the multi-user detector more than offset the effects of the increased activity factor. We also note that the outage curve for the whole-sector mixed-traffic case is closest to the curve for Zone 3, indicating that the performance of the whole-sector system is dominated by those users near the edge of the cell.

Spectral Efficiency for the Data-only Scenario

The link level results for the various transmitter and detector options can be simulated using BER equations for the decorrelating or V-BLAST detectors. As explained in the previous section entitled 'Capacity Analysis', these results can be combined with the system level results obtained above to determine the system spectral efficiency. FIGS. 14–21 show system spectral efficiency versus the number of receive antennas for a fixed data rate under the data only ($K_v=0$) scenario. In each figure, the three graphs are for different numbers of transmit antennas, and the curves in each graph are parameterized by the transmit diversity order. We fix the number of substreams per data user to be G=8 and consider the spectral efficiency as M, P, and $M_t$ are varied so that each user demodulates G/M groups of M substreams using either a decorrelator or V-BLAST detector. These results are derived from the bit error rate and outage data from the previous two sections and the techniques described in the capacity analysis sections, supra. We assume a spreading factor of N=128 and L=2 resolvable multipath components.

Figure 14:
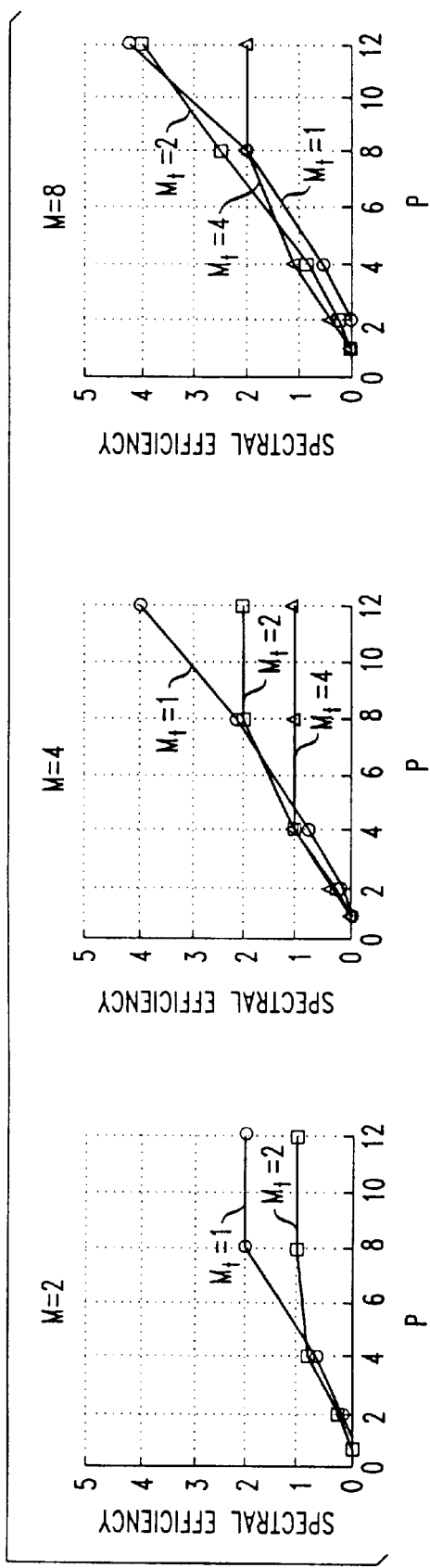
FIG. 14 shows the performance for an illustrative orthogonal, same-code transmission scheme with a V-BLAST detector.

FIG. 14 shows the performance for an orthogonal same-code transmission scheme with the V-BLAST detector. Starting with the leftmost graph (M=2), we notice that for small P, efficiency of the transmit diversity case ($M_t=2$) is better than the case without transmit diversity. For P≧8, the spectral efficiency for $M_t=2$ is limited due to the limited number of orthogonal codes available. Even though the required Eb/No decreases further as P increases, the spectral efficiency cannot grow; hence there is no improvement to the overall system capacity by adding more antennas at the receivers. From equation (2), the maximum number of users is $K_{d,max}=16$. Using (37), the maximum spectral efficiency for orthogonal same-code transmission is $SE_{max}=K_{d,max}G/N=M/M_t$. Hence $SE_{max}=1$ for $M_t=2$. Because the $M_t=1$ case has a higher code limit, its maximum spectral efficiency is higher ($SE_{max}=2$). Hence while $M_t=2$ is better for small P, its spectral efficiency is limited early on, and past this point, $M_t=1$ performs better. For M=4, we see the same trends except that now the spectral efficiency limits are higher due to increased M. Again, we observe that the highest diversity order which is not code limited provides the highest spectral efficiency. At P=12, all three transmit diversity cases have reached their code limit. For M=8 and P=12, the case with no transmit diversity is best; however, we cannot conclude from this data whether or not the point at which it is better than $M_t=2$ occurs after the $M_t=2$ case reaches its code limit. From the random code curves (where we do not experience a code limit), we are led to believe that the crossover occurs after the code limit. For situations which are not code limited ($M_t=2$, P=2, for example), the spectral efficiency decreases slightly as M increases, as we expect from the BER curves. Recall that this is the consequence of the increased interference overriding the benefits of increased spatial signal separation as M grows.

Figure 15:
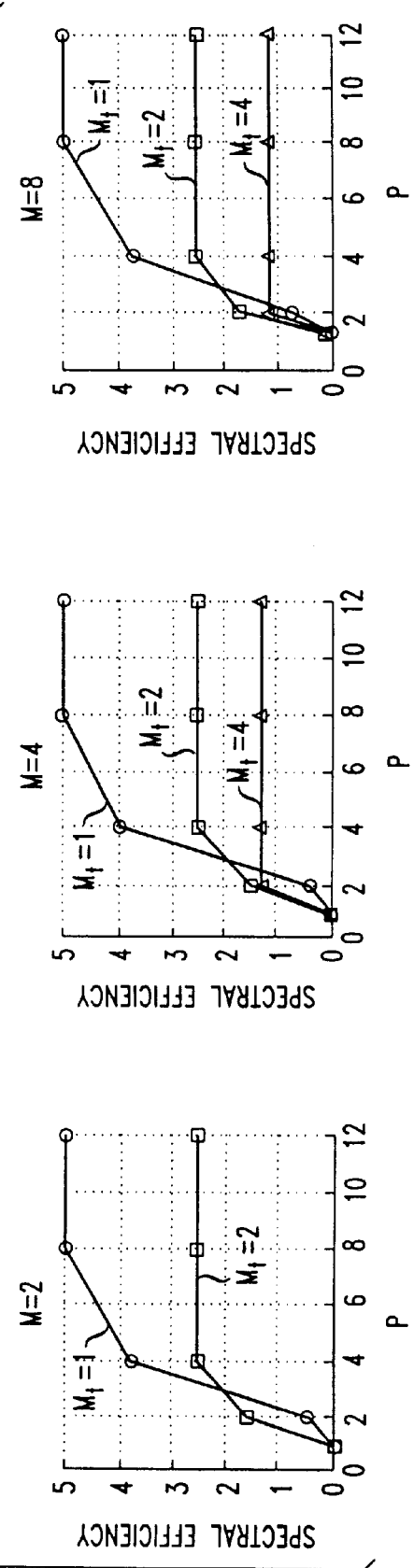
FIG. 15 shows the performance for an illustrative orthogonal, different-code transmission scheme with a V-BLAST detector.

FIG. 15 shows the performance for orthogonal different-code transmission with the V-BLAST detector. The advantage over same-code transmission is that the codes are now orthogonal even among a data user's M substreams. Unfortunately, this advantage does not buy much because the V-BLAST detector is so effective at overcoming the interference. Compare, for example, the two transmission techniques for P=4 $M_t=1$. The difference is negligible except when M=8. (Keep in mind that the vertical axes have different scales compared to FIG. 14. Spectral efficiency of orthogonal, same code transmission using a V-BLAST detector.) Furthermore, since the different code transmission has stricter code limit (from (2), $K_{d,max}=N/(GM_t)$ ) and hence lower spectral efficiency limit $SE_{max}=1/M_t$), we conclude that the orthogonal different-code transmission has only a slight performance advantage over same-code transmission when the system is not code limited; otherwise, same-code transmission is superior.

Figure 16:
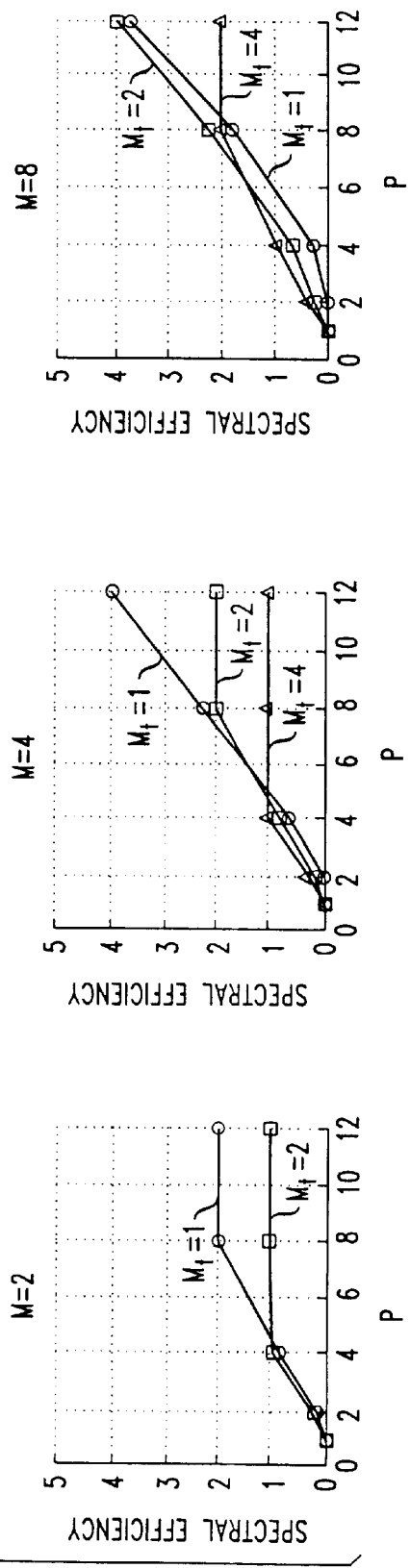
FIG. 16 shows the performance for an illustrative orthogonal, same-code transmission scheme using a decorrelating detector.
Figure 17:
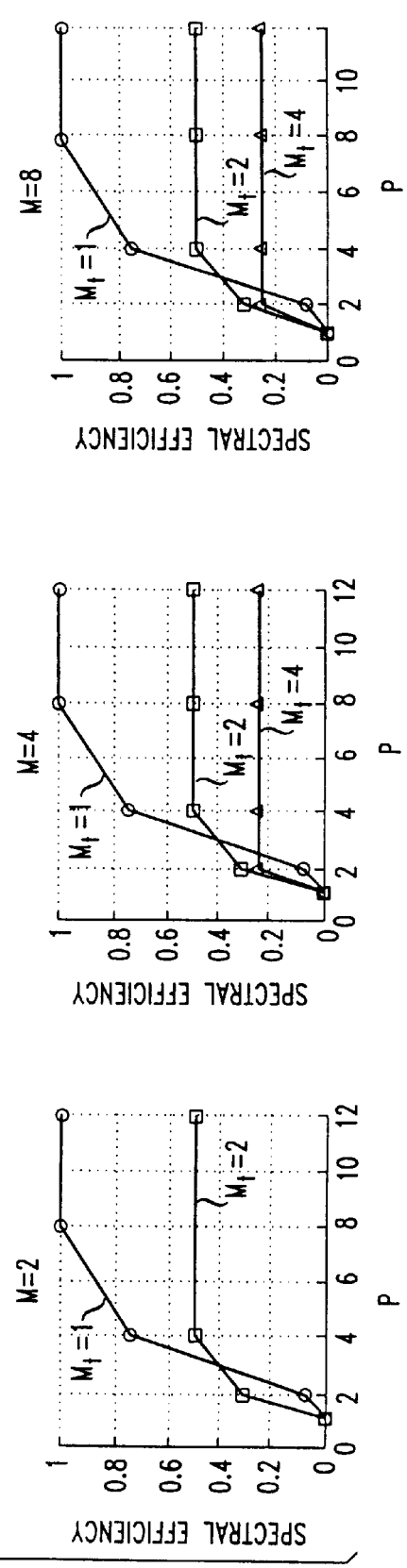
FIG. 17 shows the performance for an illustrative orthogonal, different-code transmission scheme using a decorrelating detector.
Figure 18:
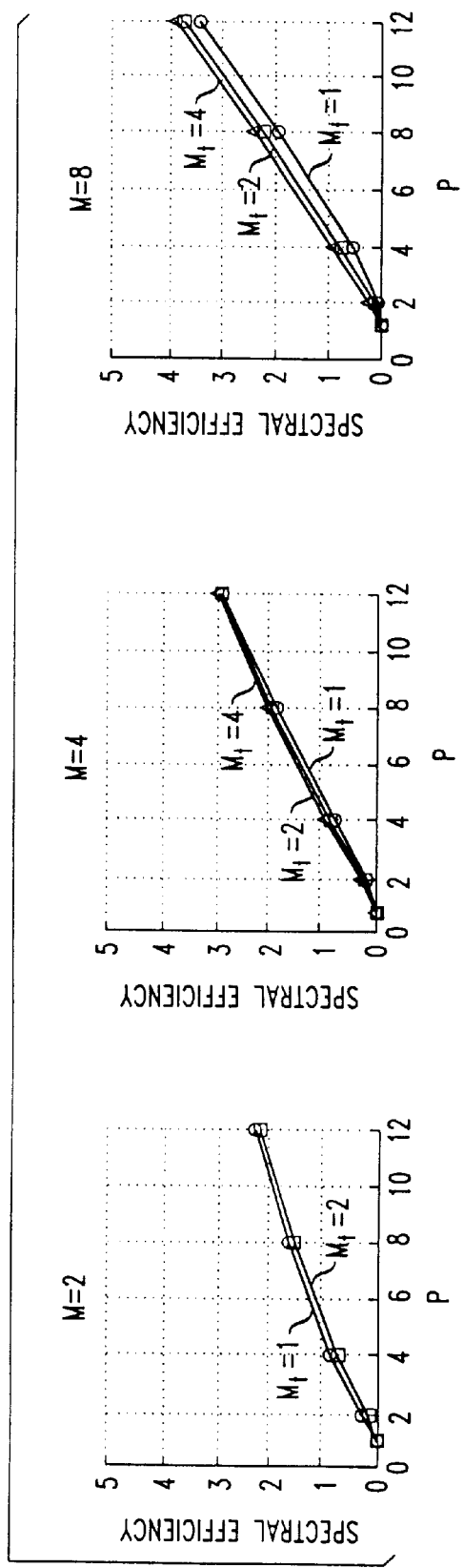
FIG. 18 shows the performance for an illustrative random, same-code transmission scheme using a V-BLAST detector.
Figure 19:
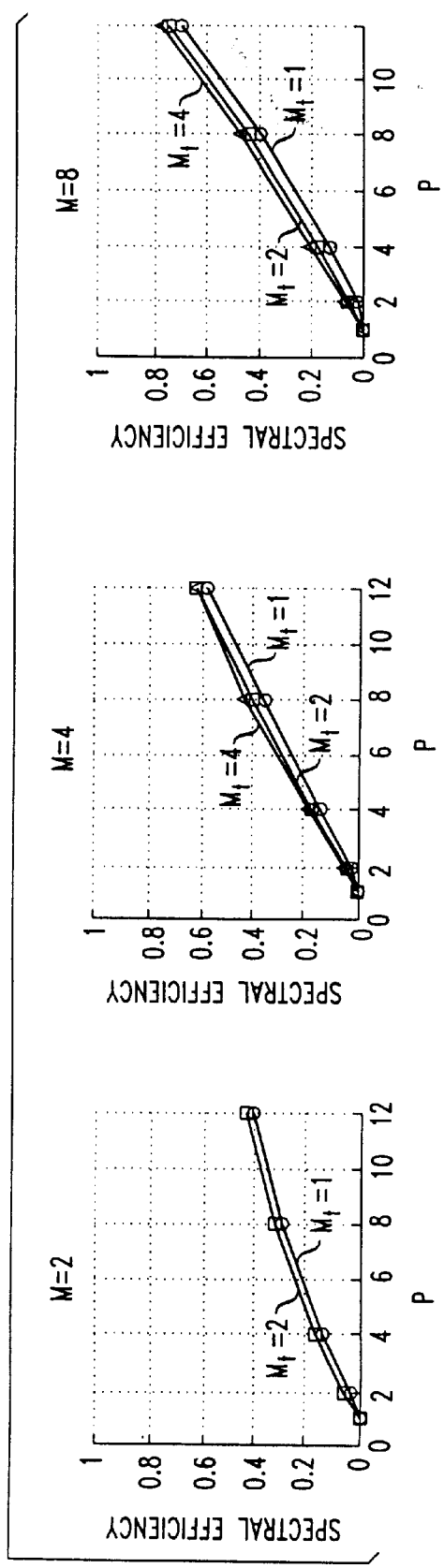
FIG. 19 shows the performance for an illustrative random, different-code transmission scheme using a V-BLAST detector.
Figure 20:
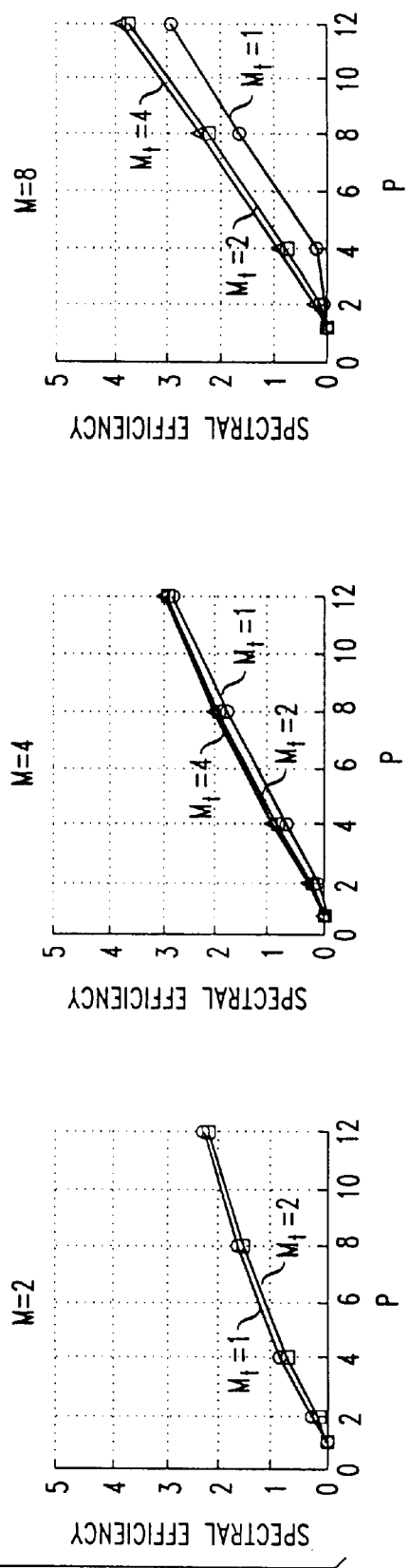
FIG. 20 shows the performance for an illustrative random, same-code transmission scheme using a decorrelating detector.
Figure 21:
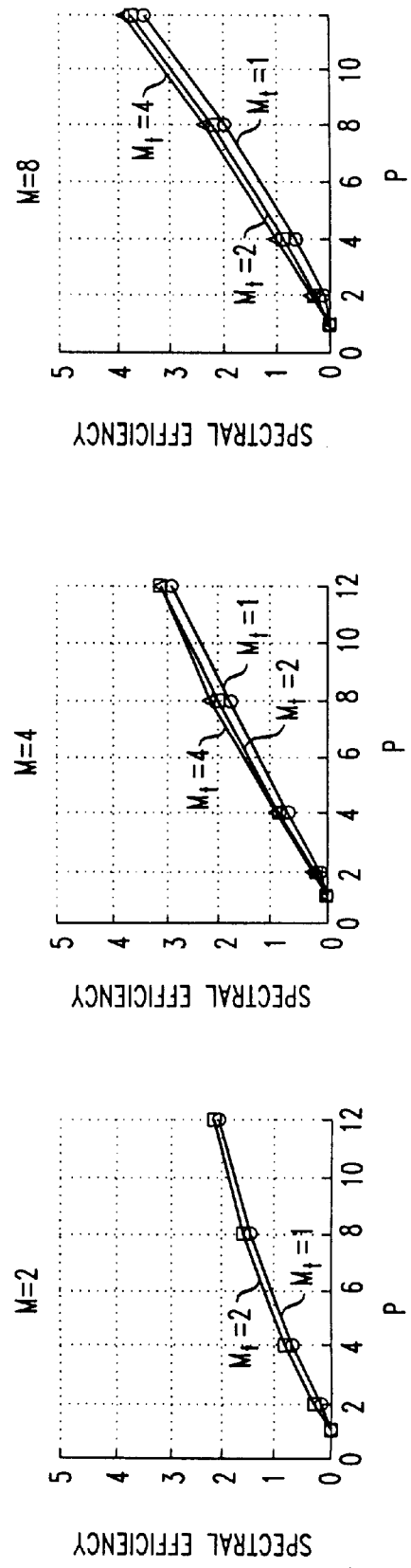
FIG. 21 shows the performance for an illustrative random, different-code transmission scheme using a decorrelating detector.

FIG. 16 shows the performance for orthogonal same-code transmission using a decorrelating detector. As with the V-BLAST detector, performance gains increase with M. However, they are reduced as P increases since the additional receive antennas provide antenna gain and signal separation to boost the decorrelator's performance. Finally, FIG. 17 shows the performance of orthogonal different-code transmission using a decorrelating detector. Essentially, the same conclusions drawn for the V-BLAST detector apply to the decorrelator detector as well.

FIGS. 18–21 show the spectral efficiencies for random code transmission. Because of the MAI among codes with the same multipath delay, the spectral efficiency for random codes will always lower bound those of the orthogonal codes when they have not reached the code limit. Since there is no code limit for the random codes, their spectral efficiency continues to grow approximately linearly with P, beyond the saturation point of the orthogonal codes. We observe the spectral efficiency increases with increasing $M_t$; however, the marginal gains diminish for large P and large $M_t$ because the marginal diversity gains diminish as the total diversity order increases. We see characteristics similar to those of the orthogonal codes with regard to M and the detector techniques and with regard to same code versus different code transmission.

It might be surprising to note that for P=1 receive antenna the spectral efficiency is zero even though multi-user detection is used. One would expect that the spectral efficiency should be at least as big as what is achieved in current systems with single antennas and matched filter detection. However, this is not the case since we did not consider any forward error-correction coding in our BER calculations. Hence with only a single receive antenna in a fast fading channel (without the time-diversity from coding) the required Eb/No to meet the target BER of 0.001 turns out to be so large that even a single user cannot be supported. On the other hand, not having the diversity gain from coding turns out to be not that critical for multiple receive antennas since there is already diversity gain from the multiple antennas.

Spectral Efficiencies for the Mixed Traffic Scenario

Figure 22A:
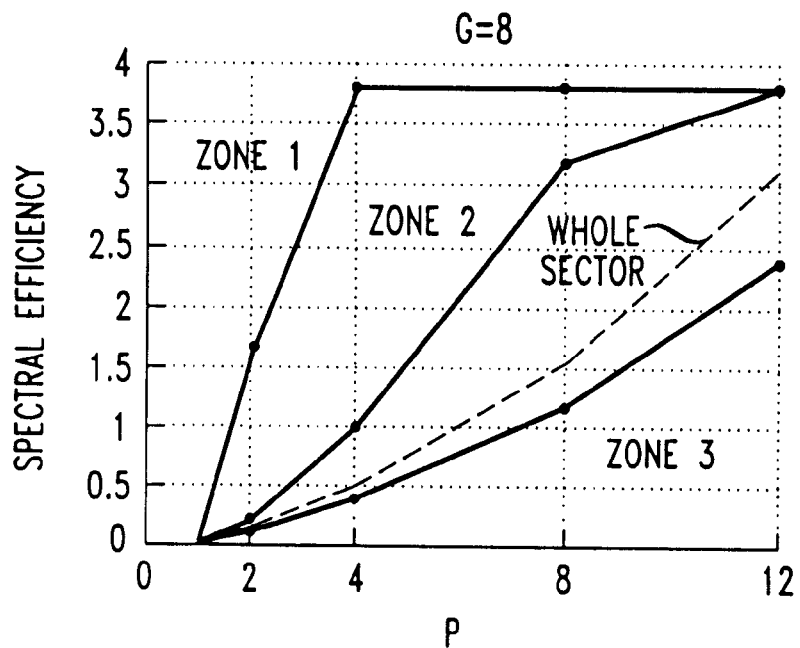
FIG. 22A shows the performance for an illustrative mixed traffic ($M=4$, $M_t=1$, $L=2$) orthogonal same-code transmission scheme, with G=8.
Figure 22B:
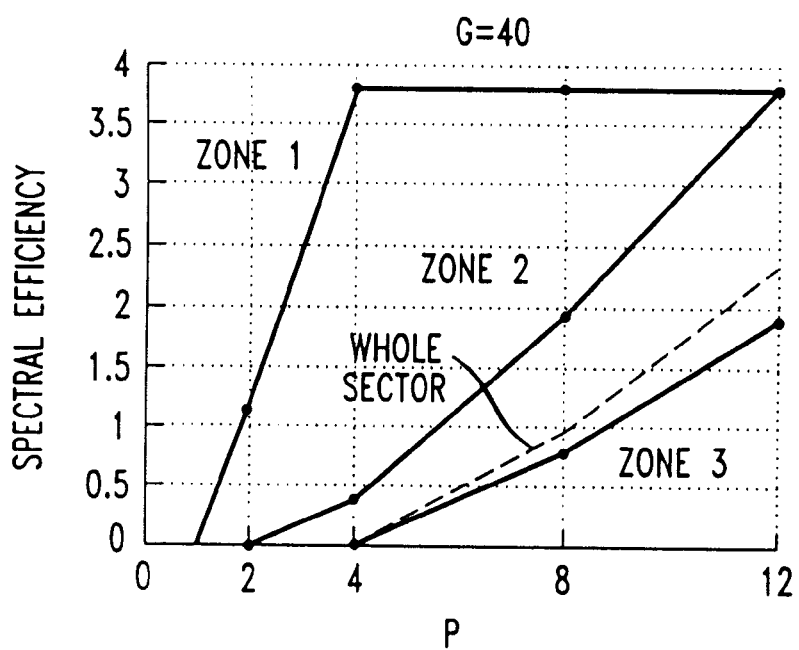
FIG. 22B shows the performance for an illustrative mixed traffic ($M=4$, $M_t=1$, $L=2$) orthogonal same-code transmission scheme, with G=40.

In a mixed traffic scenario, we consider systems operating with 40% of the maximum voice users, or 8 out of a maximum of 20 users per sector. It will be recalled from the discussion of capacity for voice-only and data-only systems above, the maximum capacity is derived assuming a 7 dB Eb/No requirement at 1% outage rate. Since the Eb/No requirement for the voice users is in general higher than for the data users, we expect the spectral efficiency of a mixed traffic system to be lower than that of the corresponding data-only system (assuming the systems are not code limited). For example, for an orthogonal same-code system with G=8, M=4, $M_r$=1, and P=8, the spectral efficiency of the data-only system is about 2.25 bps/Hz/sector compared to 1.5 bps/Hz/sector for the mixed traffic scenario with $K_v$=8 voice users. Hence the data-only system supports $K_d$=2.25N/G=36 users at 76.8 Kbps while the mixed-traffic system supports $K_d$=(15N-$K_v$)/G=23 users at 76.8 Kbps. The spectral efficiency for orthogonal same-code transmission with M=4, $M_r$=1, G=8, and using the V-BLAST detector is shown in FIG. 22A (whole sector case). This curve is upper-bounded by the corresponding curve in FIG. 22A. Note that the maximum number of data users $K_d$ Max is obtained by solving $K_{d,max} M_t G/M+K=N$. Then from (39), the maximum spectral efficiency is $$\frac{(N-K_v)M/M_t + K_v}{N},$$

and for N=128, $K_v$=8, M=4, $M_r$=1, the maximum spectral efficiency is 3.8. We also consider the case where the users receive data at 384 Kbps (G=40) (FIG. 22B). For a fixed product $K_d$G, the outage probability increases as G increases. This is because, for a fixed mobile location, it becomes more unlikely as G increases for a base station to have enough power to transmit G substreams. Hence for a given M, $M_t$, and P, the spectral efficiency decreases as G increases. In other words, the throughput per user increases at the expense of decreasing the total sector throughput, assuming that the system is not code limited. This is reflected by the whole-sector curve in FIG. 22B.

Location Dependent Spectral Efficiencies for Mixed Traffic

Figure 12:
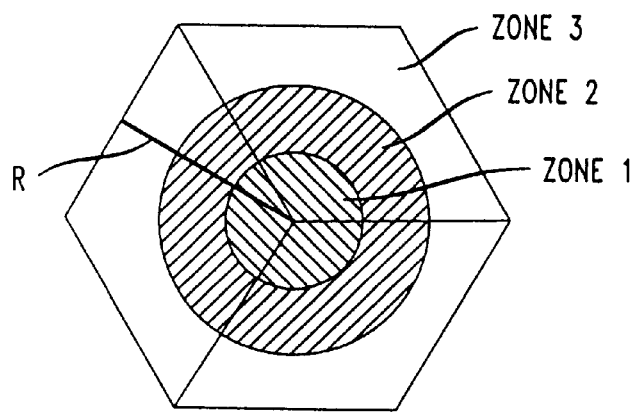
FIG. 12 shows illustrative three-zone cell configuration useful in demonstrating lack of critical dependence of user location for illustrative embodiments of the present invention.

In a system with only a small number of high speed users, reliable system capacity cannot be obtained by averaging the user locations over the entire cell since the capacity may be dominated by a few users near the cell-center. To show that our spectral efficiency figures do not critically depend on the user location distribution we consider cases where all the users are distributed within one of three zones shown in FIG. 12. Using the outage curves for the three zones, we can determine the spectral efficiency as a function of the distance from the base station. FIGS. 26A–B show the spectral efficiencies for the three zones for G=8 and 40, respectively. (As before, M=4, $M_r$=1, L=2, and orthogonal same-code transmission is used.) It shows that even when the data users are all restricted to the edge of the cell the spectral efficiency does not decrease dramatically. If data users are restricted to be close to the base station to zone 1 (recall that the voice users are distributed over the entire sector), large spectral efficiencies can be achieved using very few receive antennas. Using just P=4 receive antennas per data user and M=4 transmit antennas, if the data users are restricted to zone 1, the system can support 60 data users at 76.8 Kbps or 15 data users at 384 Kbps simultaneously with 8 voice users.

Receiver Architecture

Figure 13:
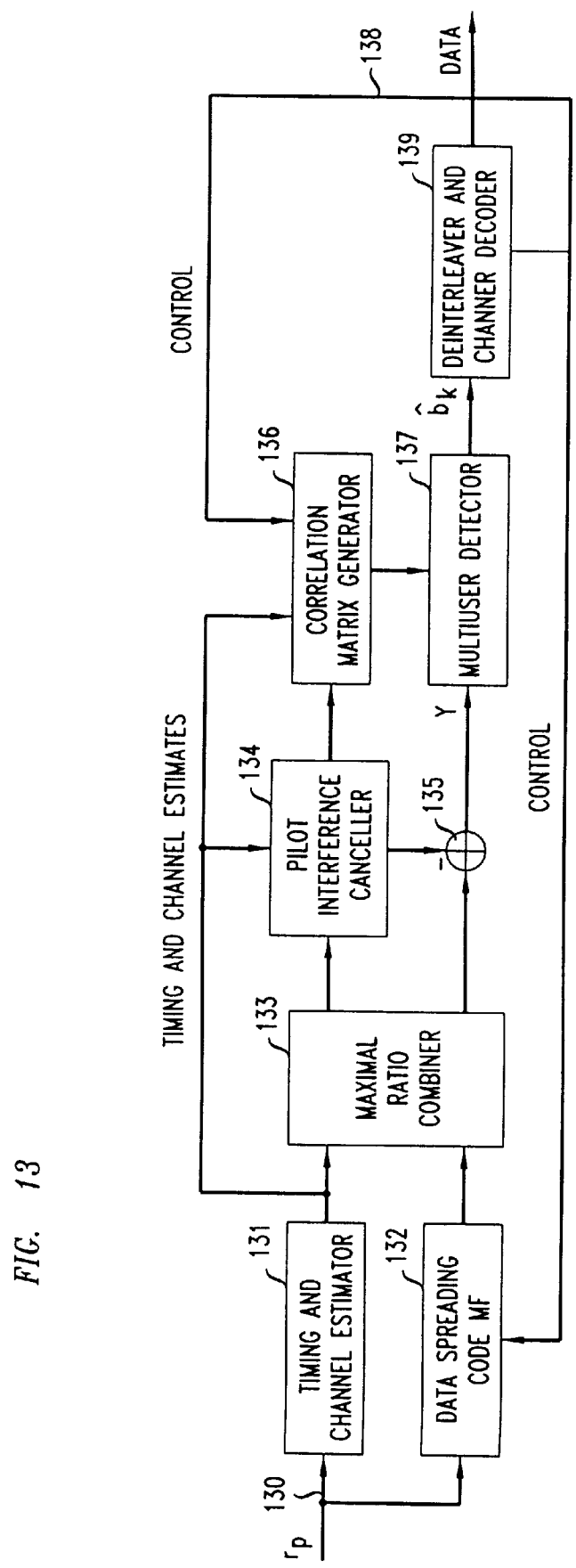
FIG. 13 shows the illustrative functional blocks used in preferred embodiments of systems generally of the type shown in FIG. 6.

In this section we describe a scheme for supporting packet data in CDMA 2000 using our transmission and detection techniques with reference to FIG. 13. Principal elements of such a receiver are described in the following six sections.

Time is assumed to be divided into frames each of which is on the order of hundreds of symbols. Each packet is transmitted over one or more frames of a dedicated traffic channel (set of substreams) assigned to each active data user. We assume that the packets to be transmitted to each user are queued up at the base station and hence the base station knows which users have data to be transmitted over the next frame at the beginning of the current frame itself. The code indices of the active users for the next frame can thus be broadcast to all the data users in a common control channel in the current frame. This information is used at the receivers to generate the code correlation matrix required for multi-user detection. We assume that the high speed data users move slowly so that the channel remains constant for the duration of several (tens of) symbols.

Figure 6:
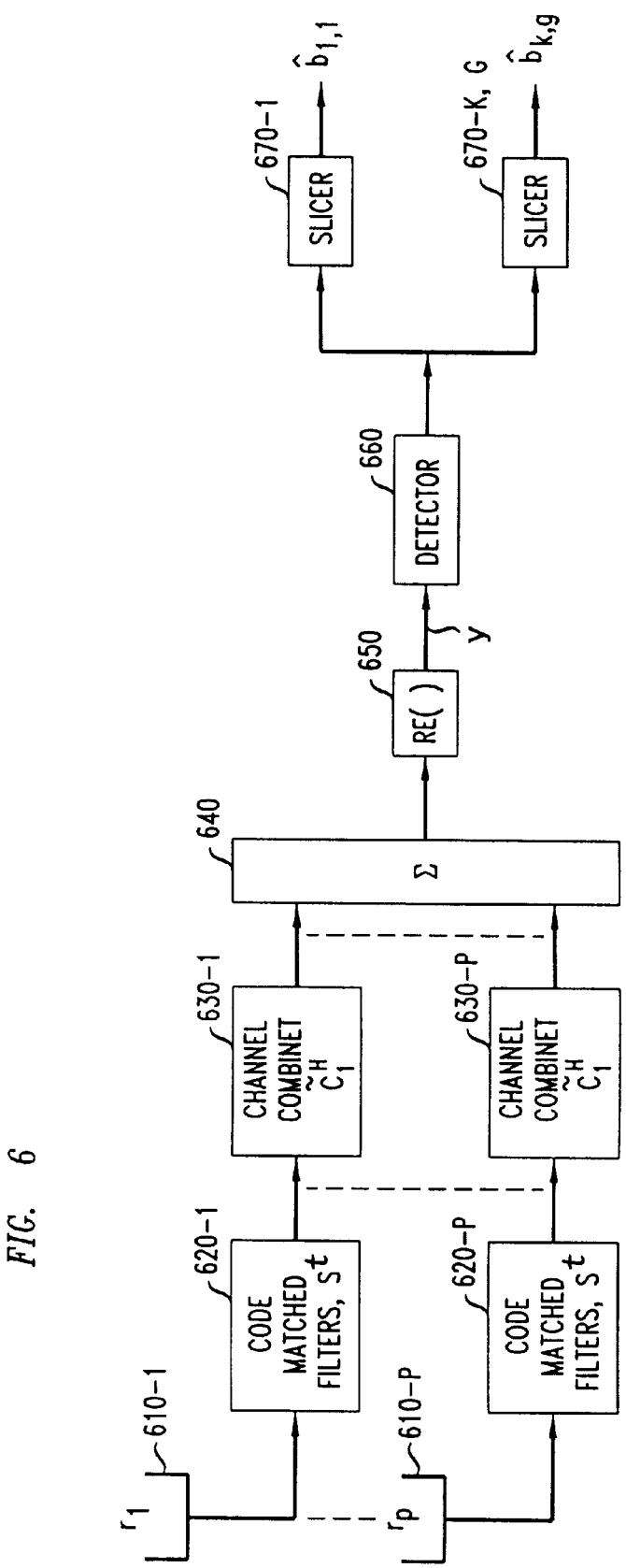
FIG. 6 is a block diagram of a space-time multiuser detector in accordance with an illustrative embodiment of the present invention.

FIG. 13 shows the key functional blocks used in a preferred implementation of a system generally of the type shown in FIG. 6. In addition to the components shown in FIG. 6, it proves advantageous in the system of FIG. 13 to employ additional element 131 to perform channel and timing estimation. These functions are advantageously performed on pilot signals (not given in the received signal model (4), but well known in the art) that are transmitted from each of the M antennas. Also, as noted earlier, indices of the set of active spreading codes are advantageously used at the receiver so that it can perform the decorrelation. This spreading code information is preferably sent via a control channel code; control messages that carrying this information will be defined for appropriate contexts and included in any industry standard. For present illustrative purposes, we assume that the spreading codes $s_{k,g,m_t}(t)$, control channel codes, and pilot codes follow 3 G CDMA standards. Specifically, the codes are mutually orthogonal and are the component-wise product of a random spreading code (which changes from symbol to symbol) and a Walsh code (which is constant from symbol to symbol). Prior to multi-user detection, the pilot multipath interference is removed using a pilot interference canceller. The correlation matrix generator block generates the correlation matrix R that is used for multi-user detection. We now describe each of the functional blocks in detail.

Timing and Channel Eestimator

Timing and channel estimator (shown as block 131 in FIG. 13) tracks the timing $\tau_{m,l}$ and estimates the coefficients $c_{m,l,p}$ of the MLP multipath signals. For each of the P receive antennas, there are L such blocks for each of the M antennas for a total of MLP estimators. Techniques used in performing these operations are well-known; see, for example F. Adachi. M. Sawahashi, and H. Suda. "Wideband DS-CDMA for next-generation mobile communications systems," *IEEE Communications Magazine,* Vol. 36, No. 9, pp. 56–69, September 1998. For the lth multipath component from the mth transmit antenna. the received signal $r_p(t)$ at the pth antenna is correlated using the mth pilot spreading code. The correlator output is weighted and summed with previous values to provide a coherent channel estimate. (Recall that the channel is assumed to be constant for tens of symbol periods.) We can thus average the channel estimate over a large window to get very precise estimates. The received signal is simultaneously correlated with advanced and retarded replicas of the pilot spreading code to drive the timing loop. The coherent channel estimates are used in the timing loop to improve robustness against tracking jitter.

Data Sspreading Code Matched Filter

Block 132 in FIG. 13 shows received signals being correlated with the data spreading codes at the appropriate multipath delay times obtained from the timing estimator 131. For each receive antenna, there are $KGM_t$ L such matched filters corresponding to the columns of the matrix $S_d$. The codes of the active substreams used in this matrix are determined by the control signal message from the base during the previous frame. If the codes for this user are assigned so that they satisfy a Walsh-Hadamard relationship, the bank of matched filters can be implemented using a Fast Walsh Hadamard transform, thus reducing the complexity. See, for example, C.-L. I. C. A. Webb III, H. Huang, S. ten Brink, S. Nanda, and R. D. Gitlin. "IS-95 Enhancements for Multimedia Services." *Bell Labs Technical Journal,* Vol. 1, No. 2, pp. 60–87, Autumn 1996.

Note that the multi-user detector 137 operates on the sufficient statistic y (length $K_dG+K_v$), but that we only require M elements at the output of the decorrelating detector or for the vector z for V-BLAST processing. These M elements can be obtained in two ways.
1. First, they could be obtained as in FIG. 6 so that the matched filter is performed with respect to all $K_dG+K_v$ codes to obtain the vector y. We would then multiply the vector by the submatrix corresponding to the first M rows of $R^{-1}$ for the decorrelator. To obtain z for the V-BLAST detector, we would then multiply the result by the M-by-M matrix $\hat{R}$.
2. Alternatively, we could obtain the M elements by using a matched filter for only the desired M substreams and not for all $K_dG+K_v$. This would entail computing the equivalent M matched filters which are linear combinations of the $K_dG+K_v$ whose weights are determined by the matrices $R^{-1}$ and $\hat{R}$.

For the decorrelating detector, the second method may result in some computational savings. However for the V-BLAST detector, the second method requires M−j+1 equivalent matched filter be computed on the jth iteration; furthermore, chip-rate filtering between the received signals $r_p$ and the equivalent matched filter is required on each iteration. Hence for the V-BLAST detector, computational savings are advantageously derived from the first method.

Space-time Rake Combiner

Space-time rake combiner 133 in FIG. 13 performs maximal ratio combining on the matched filter outputs using the channels estimates to generate the sufficient statistic vector y. In FIG. 6, the combiner corresponds to the channel combiner, the summation, and the real operator. This block may be identical to rake matched filters used in present systems.

Pilot Interference Canceller

Following the maximal ratio combiner, there will be multi-access interference (MAI) from the pilot signals if the channel is frequency selective (L>1). This interference may be significant in some cases. Pilot interference canceller 134 is therefore advantageously employed to remove such interference. Typical arrangements for removing MAI include using a pilot interference canceller that calculates and subtracts the pilot MAI contribution from each element of y. Such arrangements are described, for example, in C.-L. I. C. A. Webb III, H. Huang, S. ten Brink, S. Nanda. R. D. Gitlin. "IS-95 Enhancements for Multimedia Services." *Bell Labs Technical Journal,* Vol. 1, No. 2, pp. 60–87, Autumn 1996.

Correlation Matrix Generator

Correlation matrix generator 136 in FIG. 13 calculates the correlation matrix R used with both the decorrelator and V-BLAST detectors. This matrix depends on the specific spreading codes of the active users and channel estimates. The active code set is fixed for a given frame, and the channel is assumed to be constant for several symbols. However, the spreading codes themselves change from symbol to symbol due to the long spreading codes used in CDMA 2000 to identify the base station; hence R needs to be calculated for each symbol. Note that in a system design where long spreading codes are not used, R changes over the duration of the frame only because of channel time variations. Hence in this case the correlation matrix need not be computed every symbol. Calculation of the correlation matrix involves computing the $K_dG+K_v$-by-$K_dG+K_v$ matrix given in equation (10):

$$R = \sum_{p=1}^{P} \text{Re}[\tilde{C}_p^H S^T \tilde{C}_p].$$

Multi-user Detector (Decorrelator or V-BLAST Detector)

Both the decorrelator and the V-BLAST detector require a matrix multiplication using the appropriate M rows of the correlation matrix R. The control channel is demodulated at this point and the indicies of the active spreading codes are relayed via the control output of deinterleaver 139 to the correlation generator 136 and the data spreading matched filters 132 in FIG. 13. The most computationally intensive part of the decorrelator detector is calculating the inverse of the matrix R which changes from symbol to symbol.

Processing for the V-BLAST detector (including the front end decorrelator) will be computationally intensive and will advantageously employ a custom ASIC. In one embodiment such a custom ASIC will use a front end minimum mean-squared error (MMSE) linear combiner instead of a decorrelator. Alternatively, the decorrelator may be replaced with its first-order approximation as described, for example, in N. Mandayam and S. Verdu, "Analysis of an approximate decorrelating detector," *Wireless Personal Communications,* Vol. 6, Nos. 112, pp. 97–111. January 1998. This alternative is simpler to implement since it does not require a matrix inversion; however, performance tradeoff which depends on the number of substreams and their correlations.

Deinterleaver and Channel Decoder

Deinterleaver and channel decoder 139 shown in FIG. 13 are of well known design and provide both normal data outputs and the above-described control signals to other receiver elements.

Conclusions

We have described a high-speed CDMA system using multiple antenna transmit diversity, multicode transmission, and space-time decorrelating detectors. Using a novel technique for evaluating the system capacity, we showed that with multiple transmit and receive antennas there can be significant capacity improvements relative to the current voice system. The present inventive contributions are defined by the attached claims, but illustrative features and results include:
1. Orthogonal-code versus random-code transmission. Random codes give a lower bound on spectral efficiency with respect to any designed codes. Orthogonal codes are one example of a system with designed codes. Since the number of orthogonal codes available is equal to the spreading gain N, the spectral efficiency will be limited in an orthogonal code system. Hence until this code limit is reached, orthogonal codes will be better than random codes. At this point the orthogonal code spectral efficiency becomes saturated. The fact that random codes can actually achieve larger spectral efficiencies than this saturation point (using larger P) implies that one can use higher order modulation for the orthogonal code case to take advantage of the residual Eb/No (i.e., the larger than required Eb/No received) and to improve beyond the saturation point. More generally, in these situations, one can use higher order modulation for any "designed" code.

2. Different-code versus same-code transmission. Different-code transmission is in general only marginally better than same-code transmission. An exception occurs when the number of transmit antennas M is large and a decorrelating detector is used, in which case the difference is larger. For orthogonal code transmission, the saturation point for the spectral efficiency is a factor of M greater for same code compared to different code transmission. Hence in order to achieve higher spectral efficiencies with orthogonal codes, same code transmission should be used.

3. Number of transmit antennas (M). For a given transmission scheme (different/same code and orthogonal/random code), a given transmit diversity order $M_t$, a number of receive antennas P, and a given receiver, there is an optimum $M \leq P$ which achieves the highest spectral efficiency. (This assumes independent data streams over each antenna. It follows that it is not necessarily optimal to transmit independent data streams over all M antennas.)

4. Transmit diversity order ($M_t$). For fixed M and P, the spectral efficiency increases with $M_t$ for orthogonal codes (up to the code limit) and for random codes (where there is no hard code limit). However, for the larger values of P that were considered there is almost no increase in spectral efficiency with increasing $M_t$ indicating that the gain from transmit diversity eventually saturates.

5. Number of receive antennas (P). For fixed M, $M_t$, the spectral efficiency increases with P, and the amount of increase is more than that achieved with an identical increase in $M_t$.

6. For the range of parameters we considered, the maximum spectral efficiency (4.13 bps/Hz per sector) was achieved using orthogonal, same-code transmission with no transmit diversity ($M_t$=1), M=8 transmit antennas and P=12 receive antennas. The same scenario except with M=4 transmit antennas achieves a spectral efficiency of 4 bps/Hz per sector, corresponding to 64 users at 76.8 Kbps in a 1.25 Mhz bandwidth. Note that the data substreams in our analysis were uncoded. If instead they used rate ½ convolutional coding and a spreading factor of 64, the required Eb/No would be reduced and the resulting spectral efficiency would potentially be higher, assuming the orthogonal code limit is not reached.

Through use of the foregoing system descriptions, methods of operation and configuration choices for illustrative embodiments of the present invention, significant capacity gains will be realized using multiple transmit and receive antennas in CDMA systems. Features and gains will be achieved using the present inventive teachings though particular implementations and adaptations will include different particular parameter or component choices, or may deviate from assumed conditions respecting degree of power control, accuracy of channel estimation and complexity of processing at the receiver. Further, other reduced complexity schemes based on present inventive teachings will achieve many of the described capacity gains.

What is claimed is:

1. A method for detecting received wireless signals, said received signals corresponding to at least one data stream, at least one of said data streams having been demultiplexed into a plurality of independent data substreams prior to transmission from a plurality, M, of transmit antennas, where M is an integer greater than 1, said detecting comprising detecting at least one of said data streams, the method comprising
    receiving a set of L resolvable multipath signals relating to each of said information streams at a plurality, P, of receive antennas,
    based on said sets of L multipath signals, generating a sufficient statistic vector comprising information relating to a desired subset of data substreams,
    based on said sufficient statistic vector, generating a second vector by filtering said sufficient vector, and
    extracting said information streams corresponding to said desired subset of data substreams from said second vector.

2. The method of claim 1 wherein said filtering said sufficient vector comprises eliminating interference contributed by substreams not in said desired subset of data substreams.

3. The method of claim 2 wherein said received multipath signals comprise signals relating to at least one of said data substreams that has been spread using a spreading code comprising N chips.

4. The method of claim 3 wherein said generating a sufficient statistic vector comprises applying each of said received multipath signals to a plurality of code matched filters, each code matched filter being matched to a respective one of said spreading codes.

5. The method of claim 4 wherein said generating said detection statistic vector further comprises generating timing and channel estimates for said received multipath signals, and applying said timing and channel estimates to said chip matched filters.

6. The method of claim 5 wherein said generating channel estimates comprises generating estimates of channel coefficients $c_{m,p,l}$ for respective channels between the mth transmit antenna (m=1, 2, . . . , M) and the pth receive antenna (p=1, 2, . . . , P) over the lth multipath (l=1, 2, . . . , L).

7. The method of claim 6 wherein said generating a detection statistic vector further comprises generating, for each set of multipath signals, a channel-weighted vector by weighting each of the outputs of said chip matched filter by $c^*_{m,p,l}$, the complex conjugate of a corresponding channel coefficient, where * indicates complex conjugate.

8. The method of claim 7 wherein said generating said detection statistic vector further comprises selectively combining components of each of said channel-weighted vectors.

9. The method of claim 1 wherein said generating a sufficient statistic vector comprises applying said received sets of L resolvable multipath signals to a 2-D rake receiver, said sufficient statistic vector being the resulting output of said 2-D rake receiver.

10. The method of claim 1 wherein said extracting comprises applying said second vector to a decorrelating detector.

11. The method of claim 10 wherein said decorrelating detector projects each component of said second vector into the null space of the other components of said statistic.

12. The method of claim 2 wherein said extracting comprises processing said second vector in a decorrelating decision feedback detector.

13. The method of claim 12 wherein said second vector comprises vector components, each of which components corresponds to one of said plurality of desired substreams, and wherein said processing in said decorrelating decision feedback detector comprises (a) for each of said components, eliminating interference arising from components corresponding to other substreams, thereby generating an enhanced second vector having enhanced components for each substream, and (b) generating a detected substream by detecting the desired substream corresponding to said enhanced component in said enhanced second vector having the highest signal-to-noise ratio.

14. The method of claim 12 wherein said second vector comprises vector components, each of which components corresponds to one of said plurality of desired substreams, and wherein said processing in said decorrelating decision feedback detector comprises (a) for each of said components, eliminating interference arising from components corresponding to other substreams, thereby generating an enhanced second vector having enhanced components for each substream, (b) generating a detected substream by detecting the desired substream corresponding to said enhanced component in said enhanced second vector having the highest signal-to-noise ratio, (c) reconstructing the contribution to said second vector of said detected substream, (d) modifying said second vector by subtracting said contribution from said second vector, (e) for each remaining component in said second vector, eliminating interference arising from other components remaining in said second vector, thereby generating an enhanced second vector having enhanced components corresponding to each remaining substream, (f) repeating steps (b) through (e) until all desired substreams in a selected set of streams have been detected.

15. The method of claim 12 wherein said second vector comprises vector components, each of which components corresponds to one of said plurality of desired substreams, and wherein said processing in said decorrelating decision feedback detector comprises (a) for each of said components, eliminating interference arising from components corresponding to other substreams, thereby generating an enhanced second vector having enhanced components for each substream, (b) generating a detected substream by detecting the desired substream corresponding to said enhanced component in said enhanced second vector having the highest signal-to-noise ratio, (c) reconstructing the contribution to said second vector of said detected substream, (d) modifying said second vector by subtracting said contribution from said second vector, (e) for each remaining component in said second vector, eliminating interference arising from other components remaining in said second vector, thereby generating an enhanced second vector having enhanced components corresponding to each remaining substream, (f) repeating steps (b) through (e) until all desired substreams have been detected.

16. The method of claim 15 wherein said eliminating interference arising from other substreams comprises projecting each desired substream into the null space of the other substreams.

17. The method of claim 9 further comprising receiving pilot signals, generating interference canceling signals based on said received pilot signals, and subtracting said interference canceling signals from the output of said 2D rake filter to form said detection statistic vector.

18. The method of claim 1 wherein said extracting further comprises multiplexing said desired sets of substreams into respective ones of said data streams.

19. The method of claim 1 wherein said filtering comprises generating said second vector by selecting the group of all substreams associated with at least one data stream.

20. The method of claim 1 wherein said filtering comprises generating said second vector by selecting the group of all substreams associated with at least one data stream and eliminating interference arising from components of the other substreams.

21. The method of claim 20 wherein said eliminating interference arising from components of other substreams further comprises projecting said desired substreams into the null space spanned by said other substreams in said sufficient statistic vector.

* * * * *